(12) United States Patent
Sobecki et al.

(10) Patent No.: US 12,391,180 B2
(45) Date of Patent: Aug. 19, 2025

(54) VEHICULAR EXTERIOR REARVIEW MIRROR ASSEMBLY

(71) Applicant: MAGNA MIRRORS OF AMERICA, INC., Holland, MI (US)

(72) Inventors: Justin E. Sobecki, Rockford, MI (US); Kenneth C. Peterson, Ada, MI (US); Darryl P. De Wind, West Olive, MI (US); Jake A. Mohan, Grand Rapids, MI (US); Matthew V. Steffes, Grand Rapids, MI (US); Eric S. Deuel, Allendale, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 24 days.

(21) Appl. No.: 18/389,889

(22) Filed: Dec. 20, 2023

(65) Prior Publication Data
US 2024/0116442 A1    Apr. 11, 2024

Related U.S. Application Data

(63) Continuation of application No. 16/773,106, filed on Jan. 27, 2020, now Pat. No. 11,851,004, which is a
(Continued)

(51) Int. Cl.
*B60R 1/06*    (2006.01)
*B60Q 9/00*    (2006.01)
(Continued)

(52) U.S. Cl.
CPC ............. *B60R 1/06* (2013.01); *B60Q 9/008* (2013.01); *B60R 1/074* (2013.01); *B60R 1/082* (2013.01);
(Continued)

(58) Field of Classification Search
CPC .......... B60R 1/06; B60R 1/074; B60R 1/082; B60R 1/12; B60R 2001/1215; B60Q 9/008
(Continued)

(56) References Cited

U.S. PATENT DOCUMENTS

| 3,837,129 A | 9/1974 | Losell |
| 4,202,603 A | 5/1980 | Miyauchi |

(Continued)

FOREIGN PATENT DOCUMENTS

WO    WO-02076790 A1 *   10/2002   ............... B60R 1/06

*Primary Examiner* — Bumsuk Won
*Assistant Examiner* — Rahman Abdur
(74) *Attorney, Agent, or Firm* — HONIGMAN LLP

(57) ABSTRACT

A vehicular exterior rearview mirror assembly includes a mirror head and a mounting base configured to mount the mirror assembly at a side of a vehicle. The mirror head accommodates a reflective element and an indicator module. With the vehicular exterior rearview mirror assembly mounted at the side of the vehicle, and responsive to actuation by a driver of the vehicle of a turn signal input of the plurality of inputs, the indicator module projects a turn signal icon onto the ground proximate the side of the vehicle. With the vehicular exterior rearview mirror assembly mounted at the side of the vehicle, and responsive to another input of the plurality of inputs, the indicator module projects another icon onto the ground proximate the side of the vehicle. The other icon projected onto the ground is a different color than the turn signal icon projected onto the ground.

26 Claims, 26 Drawing Sheets

Related U.S. Application Data continuation of application No. 15/344,857, filed on Nov. 7, 2016, now Pat. No. 10,543,784, which is a continuation of application No. 14/312,056, filed on Jun. 23, 2014, now Pat. No. 9,487,142.

(60) Provisional application No. 61/875,349, filed on Sep. 9, 2013, provisional application No. 61/839,110, filed on Jun. 25, 2013.

(51) Int. Cl.
  B60R 1/074 (2006.01)
  B60R 1/08 (2006.01)
  B60R 1/12 (2006.01)

(52) U.S. Cl.
  CPC ........ *B60R 1/12* (2013.01); *B60R 2001/1215* (2013.01)

(58) Field of Classification Search
  USPC .... 340/901, 932.2, 933, 937, 425.5, 426.19, 340/359, 877; 359/841, 872
  See application file for complete search history.

(56) References Cited

U.S. PATENT DOCUMENTS

| | | |
|---|---|---|
| 4,341,444 A | 7/1982 | Stelma |
| 4,572,626 A | 2/1986 | Suzuki |
| 4,693,571 A | 9/1987 | Kimura et al. |
| 4,699,024 A | 10/1987 | Iida et al. |
| 4,826,289 A | 5/1989 | Vandenbrink et al. |
| 4,832,477 A | 5/1989 | Torii et al. |
| 4,902,108 A | 2/1990 | Byker |
| 5,005,797 A | 4/1991 | Maekawa et al. |
| 5,052,163 A | 10/1991 | Czekala |
| 5,066,112 A | 11/1991 | Lynam et al. |
| 5,069,535 A | 12/1991 | Baucke et al. |
| 5,158,638 A | 10/1992 | Osanami et al. |
| 5,190,499 A | 3/1993 | Mori et al. |
| 5,210,651 A | 5/1993 | Shibuya et al. |
| 5,327,288 A | 7/1994 | Wellington et al. |
| 5,371,659 A | 12/1994 | Pastrick et al. |
| 5,379,146 A | 1/1995 | Defendini |
| 5,421,940 A | 6/1995 | Cornils et al. |
| 5,467,230 A | 11/1995 | Boddy et al. |
| 5,489,080 A | 2/1996 | Allen |
| 5,497,306 A | 3/1996 | Pastrick |
| 5,513,048 A | 4/1996 | Chen |
| 5,525,264 A | 6/1996 | Cronin et al. |
| 5,530,240 A | 6/1996 | Larson et al. |
| 5,546,239 A | 8/1996 | Lewis |
| 5,552,094 A | 9/1996 | Kubota |
| 5,555,136 A | 9/1996 | Waldmann et al. |
| 5,572,376 A | 11/1996 | Pace |
| 5,575,552 A | 11/1996 | Faloon et al. |
| 5,579,178 A | 11/1996 | Mochizuki |
| 5,582,383 A | 12/1996 | Mertens et al. |
| 5,649,756 A | 7/1997 | Adams et al. |
| 5,669,698 A | 9/1997 | Veldman et al. |
| 5,669,699 A | 9/1997 | Pastrick et al. |
| 5,680,263 A | 10/1997 | Zimmermann et al. |
| 5,684,646 A | 11/1997 | Boddy |
| 5,701,211 A | 12/1997 | Perry et al. |
| 5,703,731 A | 12/1997 | Boddy et al. |
| 5,790,298 A | 8/1998 | Tonar |
| 5,796,176 A | 8/1998 | Kramer et al. |
| 5,818,625 A | 10/1998 | Forgette et al. |
| 5,823,054 A | 10/1998 | Brouwer |
| 5,823,654 A | 10/1998 | Pastrick et al. |
| 5,900,999 A | 5/1999 | Huizenga et al. |
| 5,903,402 A | 5/1999 | Hoek |
| 5,949,591 A | 9/1999 | Whitehead |
| 5,984,482 A | 11/1999 | Rumsey et al. |
| 6,023,229 A | 2/2000 | Bugno et al. |
| 6,064,508 A | 5/2000 | Forgette et al. |
| 6,068,380 A | 5/2000 | Lynn et al. |
| 6,102,546 A | 8/2000 | Carter |
| 6,116,743 A | 9/2000 | Hoek |
| 6,170,956 B1 | 1/2001 | Rumsey et al. |
| 6,176,602 B1 | 1/2001 | Pastrick et al. |
| 6,178,034 B1 | 1/2001 | Allemand et al. |
| 6,213,612 B1 | 4/2001 | Schnell et al. |
| 6,227,675 B1 | 5/2001 | Mertens et al. |
| 6,227,689 B1 | 5/2001 | Miller |
| 6,229,226 B1 | 5/2001 | Kramer et al. |
| 6,239,899 B1 | 5/2001 | DeVries et al. |
| 6,239,928 B1 | 5/2001 | Whitehead et al. |
| 6,243,218 B1 | 6/2001 | Whitehead |
| 6,249,369 B1 | 6/2001 | Theiste et al. |
| 6,276,821 B1 | 8/2001 | Pastrick et al. |
| 6,312,135 B1 | 11/2001 | Polzer |
| 6,315,419 B1 | 11/2001 | Platzer, Jr. |
| 6,325,518 B1 | 12/2001 | Whitehead et al. |
| 6,329,925 B1 | 12/2001 | Skiver et al. |
| 6,369,804 B1 | 4/2002 | Sandbach |
| 6,407,468 B1 | 6/2002 | LeVesque et al. |
| 6,407,847 B1 | 6/2002 | Poll et al. |
| 6,439,755 B1 | 8/2002 | Fant, Jr. et al. |
| 6,452,479 B1 | 9/2002 | Sandbach |
| 6,467,920 B2 | 10/2002 | Schnell et al. |
| 6,499,850 B2 | 12/2002 | Waldmann |
| 6,502,970 B1 | 1/2003 | Anderson et al. |
| 6,522,451 B1 | 2/2003 | Lynam |
| 6,535,126 B2 | 3/2003 | Lin et al. |
| 6,565,221 B2 | 5/2003 | Guttenberger et al. |
| 6,582,109 B2 | 6/2003 | Miller |
| 6,598,980 B2 | 7/2003 | Marusawa et al. |
| 6,606,183 B2 | 8/2003 | Ikai et al. |
| 6,614,579 B2 | 9/2003 | Roberts et al. |
| 6,619,955 B2 | 9/2003 | Cardarelli |
| 6,650,457 B2 | 11/2003 | Busscher et al. |
| 6,690,268 B2 | 2/2004 | Schofield et al. |
| 6,698,905 B1 | 3/2004 | Whitehead |
| 6,916,100 B2 | 7/2005 | Pavao |
| 6,954,152 B1 | 10/2005 | Matthews |
| 6,981,774 B2 | 1/2006 | Dumont et al. |
| 7,012,729 B2 | 3/2006 | Tonazzi et al. |
| 7,080,914 B1 | 7/2006 | Boddy |
| 7,093,946 B2 | 8/2006 | Barve et al. |
| 7,093,965 B2 | 8/2006 | Veldman |
| 7,097,312 B2 | 8/2006 | Platzer, Jr. |
| 7,104,663 B2 | 9/2006 | Whitehead |
| 7,110,156 B2 | 9/2006 | Lawlor et al. |
| 7,126,456 B2 | 10/2006 | Boddy et al. |
| 7,159,992 B2 | 1/2007 | Foote |
| 7,175,321 B1 | 2/2007 | Lopez |
| 7,195,381 B2 | 3/2007 | Lynam et al. |
| 7,249,860 B2 | 7/2007 | Kulas et al. |
| 7,253,723 B2 | 8/2007 | Lindahl et al. |
| 7,267,449 B1 | 9/2007 | Boddy et al. |
| 7,314,285 B2 | 1/2008 | Ruse et al. |
| 7,360,932 B2 | 4/2008 | Uken et al. |
| 7,370,983 B2 | 5/2008 | DeWind et al. |
| 7,510,311 B2 | 3/2009 | Romas et al. |
| 7,532,149 B2 | 5/2009 | Banko et al. |
| 7,626,749 B2 | 12/2009 | Baur et al. |
| 7,690,800 B2 | 4/2010 | Fukai et al. |
| 7,722,199 B2 | 5/2010 | DeWard et al. |
| 7,817,020 B2 | 10/2010 | Turnbull et al. |
| 7,883,224 B2 | 2/2011 | Onuki |
| 7,926,960 B2 | 4/2011 | Skiver et al. |
| 7,944,371 B2 | 5/2011 | Foote et al. |
| 7,980,711 B2 | 7/2011 | Takayanagi et al. |
| 8,004,741 B2 | 8/2011 | Tonar et al. |
| 8,018,440 B2 | 9/2011 | Townsend et al. |
| 8,048,085 B2 | 11/2011 | Peterson et al. |
| 8,049,640 B2 | 11/2011 | Uken et al. |
| 8,154,418 B2 | 4/2012 | Peterson et al. |
| 8,169,684 B2 | 5/2012 | Bugno et al. |
| 8,179,586 B2 | 5/2012 | Schofield et al. |
| 8,194,133 B2 | 6/2012 | DeWind et al. |
| 8,237,909 B2 | 8/2012 | Ostreko et al. |
| 8,339,526 B2 | 12/2012 | Minikey, Jr. et al. |

(56) References Cited

U.S. PATENT DOCUMENTS

| | | |
|---|---|---|
| 8,366,285 B2 | 2/2013 | Reedman et al. |
| 8,459,809 B2 | 6/2013 | Zhao |
| 8,465,161 B2 | 6/2013 | DeWind et al. |
| 8,508,831 B2 | 8/2013 | De Wind et al. |
| 8,730,553 B2 | 5/2014 | De Wind et al. |
| 8,786,704 B2 | 7/2014 | Foote et al. |
| 10,543,784 B2 | 1/2020 | Sobecki et al. |
| 11,851,004 B2 | 12/2023 | Sobecki et al. |
| 2002/0063978 A1 | 5/2002 | Guttenberger et al. |
| 2005/0099710 A1 | 5/2005 | Ro |
| 2005/0117364 A1 | 6/2005 | Rennick et al. |
| 2005/0128612 A1 | 6/2005 | Ro |
| 2005/0248863 A1 | 11/2005 | Kawanishi |
| 2005/0281043 A1 | 12/2005 | Eisenbraun |
| 2006/0050018 A1 | 3/2006 | Hutzel et al. |
| 2006/0061008 A1 | 3/2006 | Karner et al. |
| 2006/0250224 A1 | 11/2006 | Steffel |
| 2006/0262550 A1 | 11/2006 | Pastrick et al. |
| 2007/0002477 A1 | 1/2007 | Whitehead |
| 2007/0058257 A1 | 3/2007 | Lynam |
| 2007/0139751 A1 | 6/2007 | Kuiper et al. |
| 2007/0285812 A1 | 12/2007 | Foote et al. |
| 2008/0100939 A1 | 5/2008 | Brester |
| 2008/0304705 A1 | 12/2008 | Pomerleau et al. |
| 2009/0040306 A1 | 2/2009 | Foote et al. |
| 2009/0073709 A1 | 3/2009 | Yajima et al. |
| 2009/0243824 A1 | 10/2009 | Peterson et al. |
| 2011/0170307 A1 | 7/2011 | Ishikawa et al. |
| 2011/0194203 A1 | 8/2011 | Foote et al. |
| 2011/0317242 A1 | 12/2011 | Tonar et al. |
| 2012/0026571 A1 | 2/2012 | Uken et al. |
| 2012/0038964 A1 | 2/2012 | De Wind et al. |
| 2012/0081915 A1 | 4/2012 | Foote et al. |
| 2012/0236388 A1 | 9/2012 | De Wind et al. |
| 2012/0326888 A1 | 12/2012 | Lynam |
| 2013/0107386 A1 | 5/2013 | Sobecki et al. |
| 2014/0133044 A1 | 5/2014 | Mambourg |
| 2014/0320823 A1* | 10/2014 | Ammar ............... B60Q 1/0023 353/13 |
| 2014/0376119 A1 | 12/2014 | Sobecki et al. |
| 2015/0097955 A1 | 4/2015 | De Wind et al. |
| 2015/0353018 A1 | 12/2015 | Sobecki et al. |
| 2018/0229648 A1* | 8/2018 | Meier .................. F21S 43/235 |

\* cited by examiner

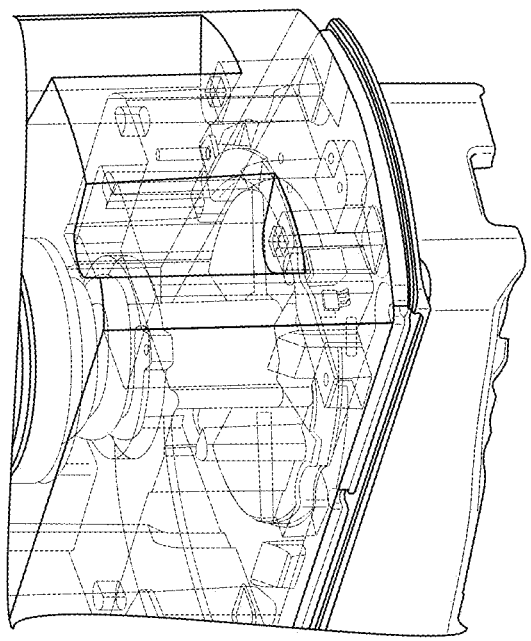
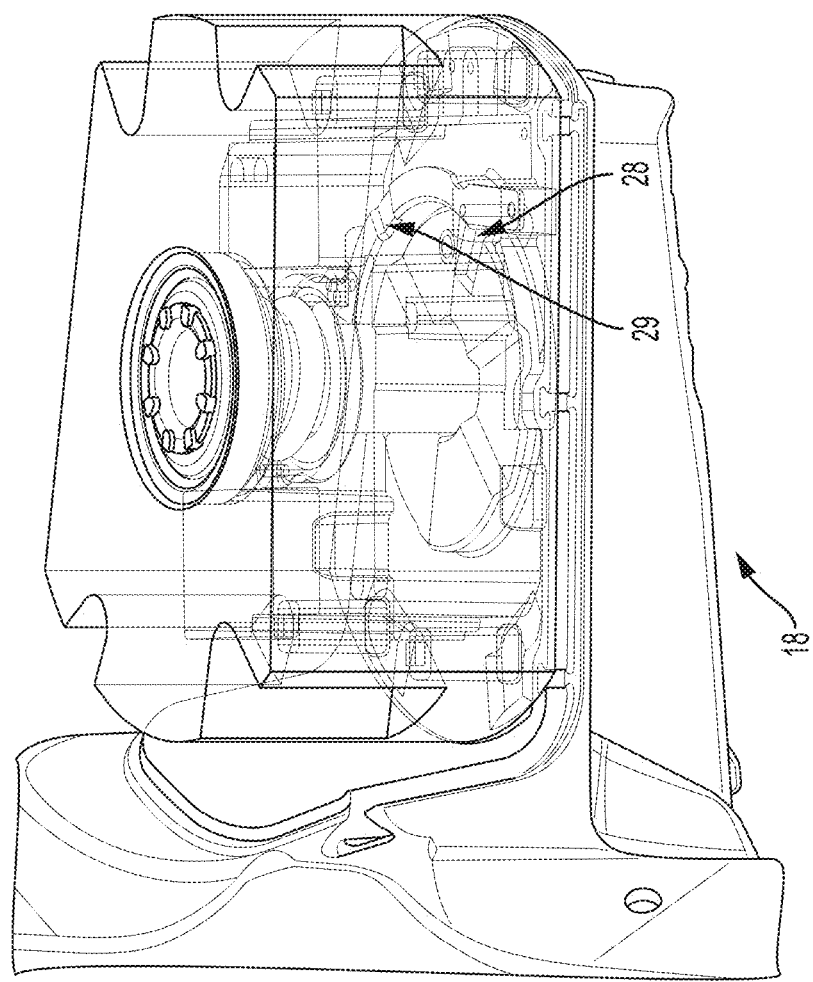
FIG. 9B
FIG. 9A

| | | | | | Resulting Position from the following start locations: | | | | | | | Does it assume a dersired user position? (if so that position will be colored red.) | Does it need the LH and RH mirror communication? |
|---|---|---|---|---|---|---|---|---|---|---|---|---|---|
| | | | | | Drive Position | | Park | | Forward Position | | Between Park and Drive | | |
| Options | Detent Sensor | Rearward Range Sensor | Drive Position Sensor | Friction Device | Number of PF buttons | IN Detent | OUT of Detent | IN Detent | OUT of Detent | IN Detent | OUT of Detent | IN Detent | OUT of Detent | | |
| Option 1 | 1 | 0 | 0 | 0 | 1 | P | © | D | D | F | © | SD | © | YES | YES |
| Option 2 | 1 | 1 | 0 | 1 | 1 | P | P | D | D | P | P | © | © | YES | YES |
| Option 3 | 1 | 0 | 1 | 1 | 1 | P | P | D | D | © | © | CC | CC | YES | YES |
| Option 4 | 1 | 1 | 1 | 1 | 2 | UC | UC | D | D | UC | UC | © | © | YES | YES |
| Option 5 | 1 | 0 | 1 | 1 | 2 | UC | UC | UC | UC | UC | UC | UC | UC | NO | NO |
| Option 6 | 1 | 1 | 0 | 1 | 2 | UC | UC | UC | UC | UC | UC | UC | UC | NO | NO |

P = Park position
D = Drive Postion
F= Forward
SD = Switch Dependant. It depends on the direction the PF was last going.
CC= Customers Choice, we could make it go to Park or Drive
UC= Users Choice can go to drive or park depending on which button is pressed.

FIG. 11

VEHICULAR EXTERIOR REARVIEW MIRROR ASSEMBLY

CROSS REFERENCE TO RELATED APPLICATIONS

The present application is a continuation of U.S. patent application Ser. No. 16/773,106, filed Jan. 27, 2020, now U.S. Pat. No. 11,851,004, which is a continuation of U.S. patent application Ser. No. 15/344,857, filed Nov. 7, 2016, now U.S. Pat. No. 10,543,784, which is a continuation of U.S. patent application Ser. No. 14/312,056, filed Jun. 23, 2014, now U.S. Pat. No. 9,487,142, which claims the filing benefits of U.S. provisional applications, Ser. No. 61/875,349, filed Sep. 9, 2013, and Ser. No. 61/839,110, filed Jun. 25, 2013, which are hereby incorporated herein by reference in their entireties.

FIELD OF THE INVENTION

The present invention relates generally to the field of rearview mirror assemblies for vehicles.

BACKGROUND OF THE INVENTION

It is known to provide an automotive rearview mirror assembly that includes one or more accessories, such as a light source and/or a user input or the like. The mirror reflective element of such known mirror assemblies include a mirror reflector coating that is vacuum deposited or sputter coated onto a surface of a glass substrate of the mirror reflective element, and for exterior mirror applications may include visual indicators such as turn signal indicators and blind zone indicators that indicate to a driver presence of another overtaking vehicle in a side lane adjacent to the equipped vehicle. The exterior rearview mirror may comprise a foldable mirror assembly, such as a powerfold mirror where the mirror head is pivotable between a drive or use position and a folded or park position via an actuator.

SUMMARY OF THE INVENTION

The present invention provides a rearview mirror assembly (such as an exterior mirror assembly mounted at a side of an equipped vehicle) that includes a powerfold actuator system to pivot the mirror head of the mirror assembly between a drive or use position and a folded or park position responsive to a user input. The powerfold system is operable to provide the desired adjustment of the mirror head via a single actuation of the user input.

Optionally, the exterior rearview mirror assembly may include a turn signal indicator, which is operable to project a turn signal indication (such as an arrow or the like) downward onto the ground area adjacent to the vehicle to enhance visibility and discernibility of the turn signal indication, such as to a bicyclist or pedestrian or the like next to or approaching the vehicle.

Optionally, the exterior rearview mirror assembly may include a camera (such as a camera having a generally rearward and/or sideward field of view at the side of the vehicle at which the exterior rearview mirror assembly is mounted. Optionally, the camera may be extendable to provide an enhanced rearward field of view, such as in response to a user input or other triggering event.

Optionally, the exterior rearview mirror assembly may include a spotter mirror element to provide an enhanced wide angle field of view rearward of the vehicle. Optionally, the spotter mirror element may be formed with or assembled with a portion of the mirror casing, such that a cap portion may be added to the mirror assembly, whereby the spotter mirror element is fixed relative to the casing and not part of the adjustable reflective element of the mirror assembly.

Optionally, an interior rearview mirror assembly may be provided that includes a user input or button that protrudes at least partially through and/or is accessible through a hole or aperture or passageway formed through the mirror reflective element and through the glass substrate or substrates of the mirror reflective element. The mirror assembly may include an illumination source at or near the user input to illuminate or backlight the user input to enhance the appearance of the user input and mirror assembly, particularly at low lighting conditions. The mirror reflective element may comprise a frameless reflective element with the perimeter edge of the glass substrate exposed, whereby the illumination emanating from the illumination source provides illumination at the exposed perimeter edge of the glass substrate of the mirror reflective element.

These and other objects, advantages, purposes and features of the present invention will become apparent upon review of the following specification in conjunction with the drawings.

BRIEF DESCRIPTION OF THE DRAWINGS

FIGS. 9A and 9B are sectional views of a powerfold mirror actuator having a rearward range sensor in accordance with the present invention;

FIG. 11 is a table showing different powerfold actuator options of the present invention;

DESCRIPTION OF THE PREFERRED EMBODIMENTS

Figure 1:
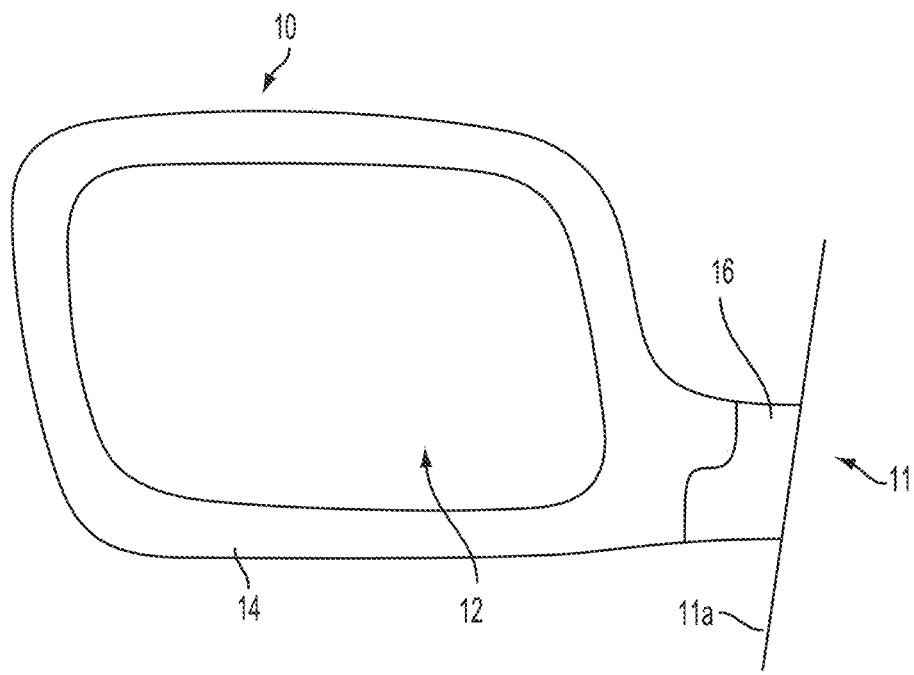
FIG. 1 is a perspective view of an exterior rearview mirror assembly in accordance with the present invention.

Referring now to the drawings and the illustrative embodiments depicted therein, an exterior rearview mirror assembly 10 for a vehicle 11 includes a mirror reflective element 12 received in and/or supported at or by a mirror shell or casing or head portion 14 (FIG. 1). The mirror casing or head portion 14 may be fixedly attached at a mounting arm or base 16 at the side of the vehicle or may be movably mounted to a mounting arm or base or portion 16, and may comprise a breakaway mirror (where the mirror head portion may be manually pivoted about the mounting arm or base) or may comprise a powerfold mirror (where the mirror head portion may be pivoted via an actuator assembly or adjustment device). Mounting arm or base 16 of mirror assembly 10 is mounted at the side 11a of a host or subject vehicle 11, with the reflective element 12 providing a rearward field of view along the respective side of the vehicle to the driver of the vehicle, as discussed below.

Figure 3:
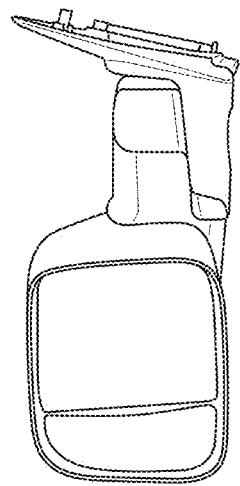
FIG. 3 is a perspective view of the exterior mirror assembly of FIG. 2.
Figure 2:
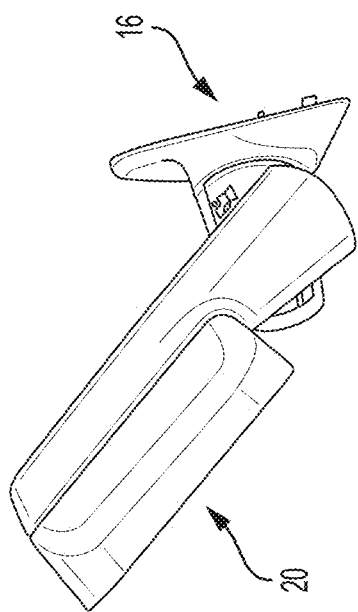
FIG. 2 is a top plan view of the exterior mirror assembly, with the mirror head pivoted to a forward position.
Figure 4:
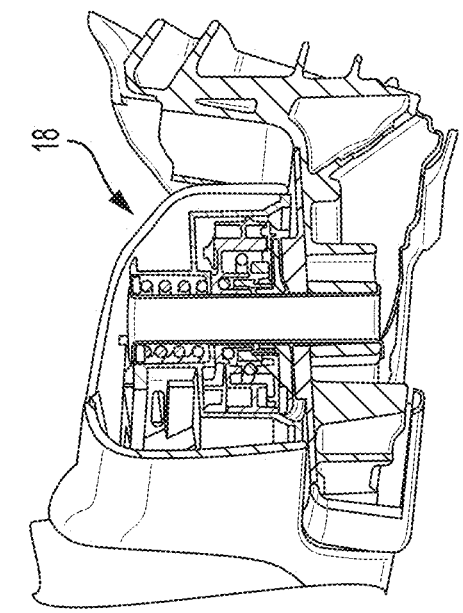
FIG. 4 is a sectional view of a powerfold actuator assembly for an exterior mirror assembly.
Figure 5B:
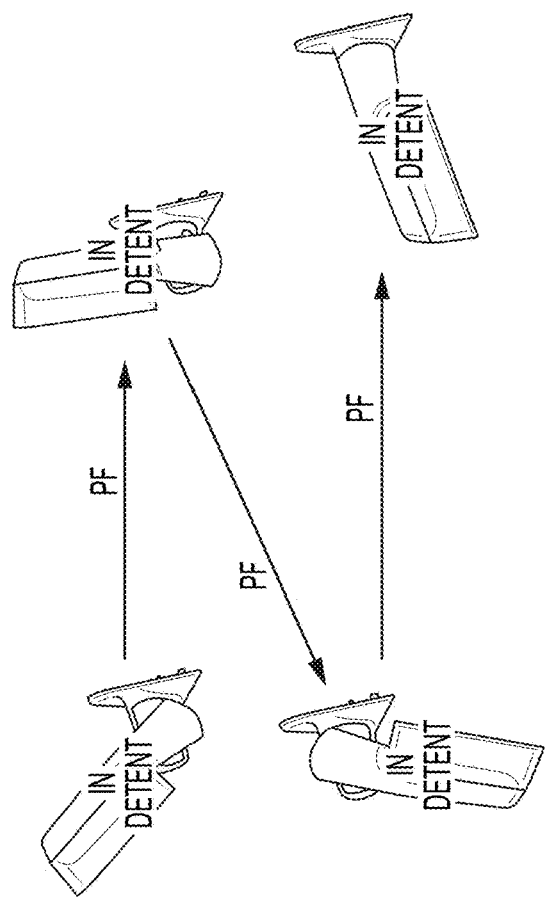
FIG. 5B is a schematic showing the steps conventionally used by powerfold mirrors to pivot the head from a forward pivot position to a drive position.

As shown in FIGS. 2-4, the mirror assembly comprises a powerfold mirror assembly that includes an actuator 18 that is operable to pivot the mirror head 20 (comprising the mirror casing 14 and reflective element 12) relative to the mounting arm or base 16. The actuator operates, response to a user input 22 (FIG. 6A), to pivot the mirror head 20 between a plurality of detent positions, including a forward position (FIG. 2), a user or drive position (first position in FIG. 5A) and a folded or park position (second position in FIG. 5A). Optionally, the mirror head may also be pivoted to a fully forward detent position (second position in FIG. 5B).

Figure 5A:
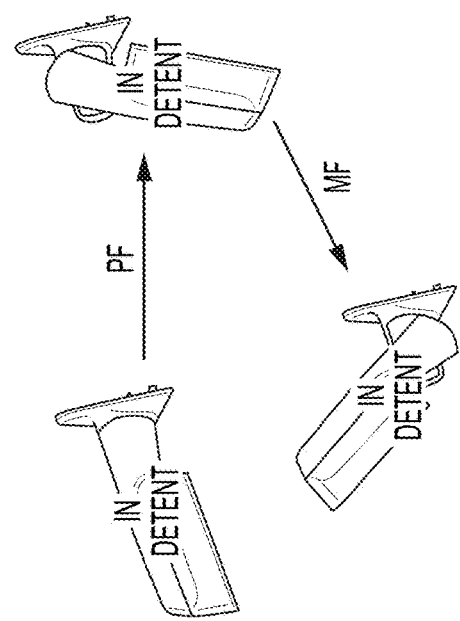
FIG. 5A is a schematic showing the steps conventionally used by powerfold mirrors to pivot the head from a drive position to a forward pivot position.
Figure 6A:
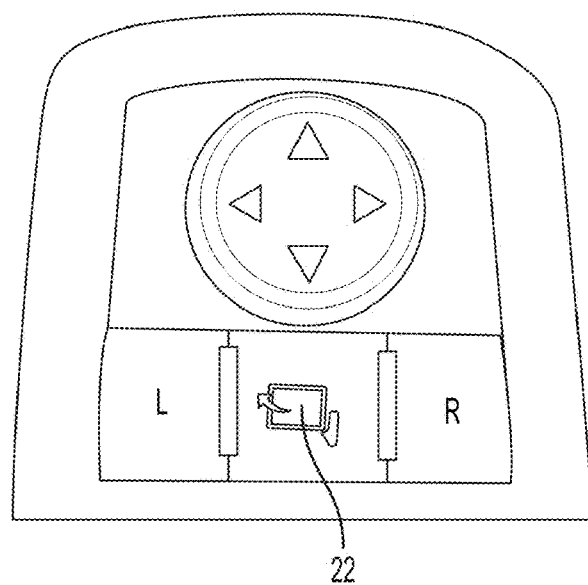
FIG. 6A is a plan view of a mirror actuator control or user input, shown with a single powerfold user input.

Known powerfold detent systems can be confusing to end users. For example, the mirror head may appear as if it is at the drive or home position but it could be out of the detent position, which may result in warranty returns due to the corresponding poor vibration performance and because the mirror head may feel like it is broken or loose. After a manual adjustment or cycle of the mirror head, a known powerfold mirror system may need multiple button presses to get the mirror head to the desired position or positions. There is no positional feedback in current or known powerfold systems. A current exemplary powerfold system allows the mirror to stop at thirteen different states after different combinations of power folds and manual fold cycles. Today there is no positional feedback in the mirror and because of that it can take multiple (such as up to three) cycles of the user's powerfold actuator button to return the mirror to the drive position. For example, when the mirror is pivoted forward (such as shown in FIG. 2), such a mirror state may require three cycles of the user's powerfold input or button to return the mirror to its drive position (see, for example, FIG. 5B). Likewise, and such as shown in FIG. 5A, it may take two actuations of the user's powerfold input or button to move the mirror head from its drive or use position to the forward pivoted state (because the first actuation pivots the mirror head to its park or folded position or state).

Figure 6B:
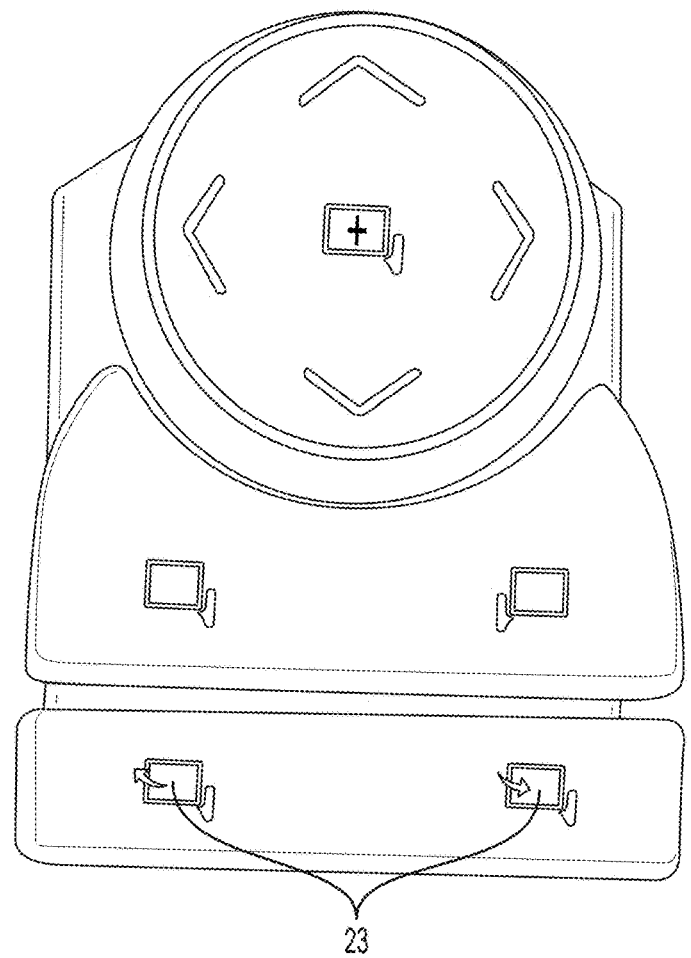
FIG. 6B is a plan view of a mirror actuator control or user input, shown with two powerfold user inputs.

The mirror assembly of the present invention includes one or more sensors in the mirror to reduce the number of user inputs to only one input or actuation for all scenarios or positions of the mirror head. The present invention thus may add positional feedback and "intelligence" into the mirror system in order to correctly move the mirror with minimal assumptions and minimal inputs from the driver. The present invention may include a built in shut off device that monitors both voltage and temperature of the powerfold actuator. The powerfold system or systems of the present invention may be operable in response to a single button powerfold user input (see user input 22 in FIG. 6A), whereby the powerfold actuator alternates the rotation direction on every switch actuation (for example, if a first actuation of the powerfold user input pivots the mirror head in a direction towards the folded or park position, the next actuation of the user input will pivot the mirror head in the opposite direction or towards the forward position), or may be operable in response to a two button powerfold user input (see user input 23 in FIG. 6B), whereby the powerfold actuator rotates in the direction that is indicated on each of the buttons on the switch or user input.

Figure 7:
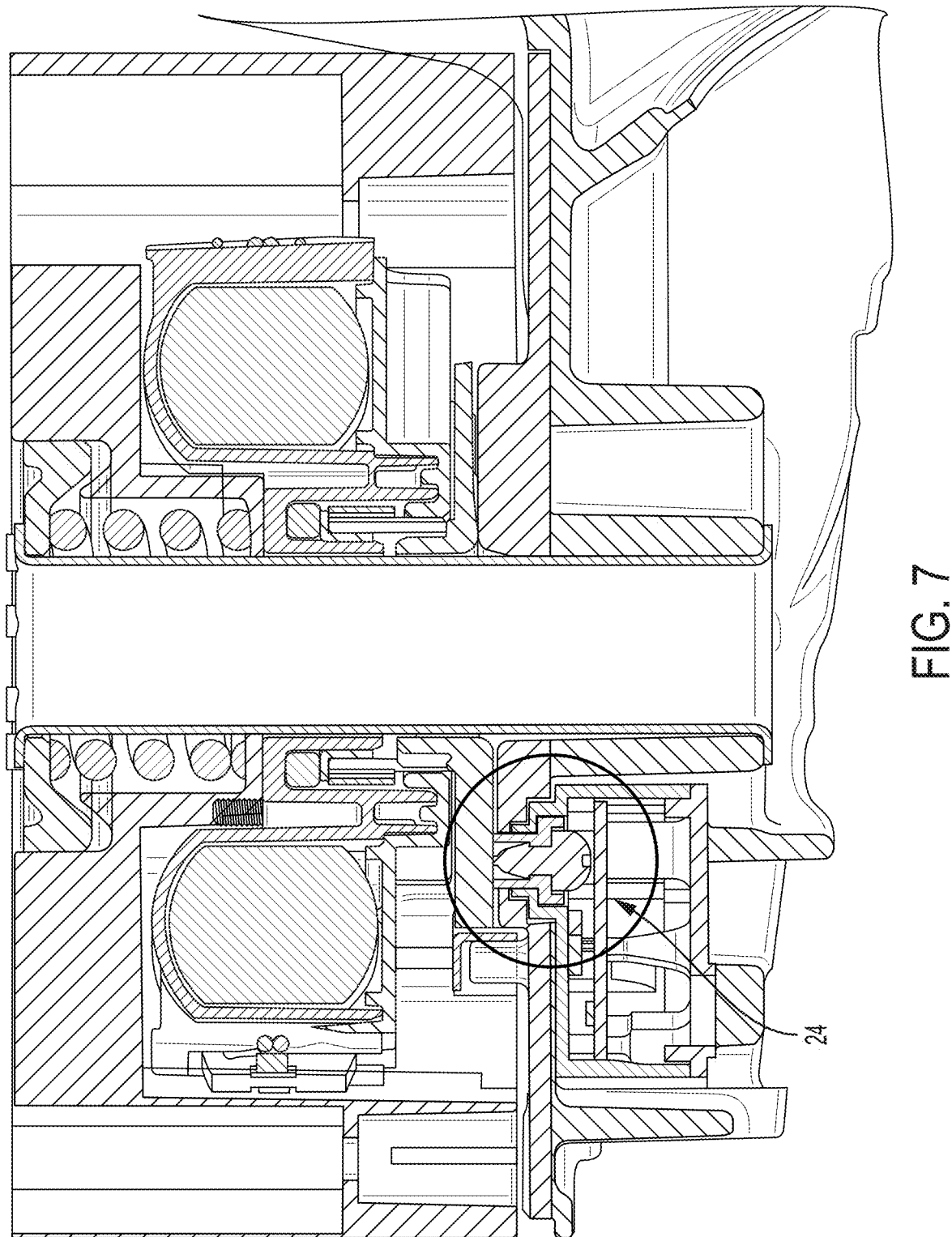
FIG. 7 is a sectional view of a powerfold mirror actuator having a detent sensor in accordance with the present invention.

The powerfold system of the present invention includes one or more sensors to assist the system in knowing the position or general position of the mirror head so that the mirror head is adjusted appropriately in response to the user input or inputs. For example, and with reference to FIG. 7, the powerfold system may include a detent sensor 24 at the actuator 18. The detent sensor may comprise any suitable sensor, such as a mechanical switch or hall effect switch or the like, that detects if the mirror head is lifted and is out of one of the detents of the mirror assembly.

Figure 8:
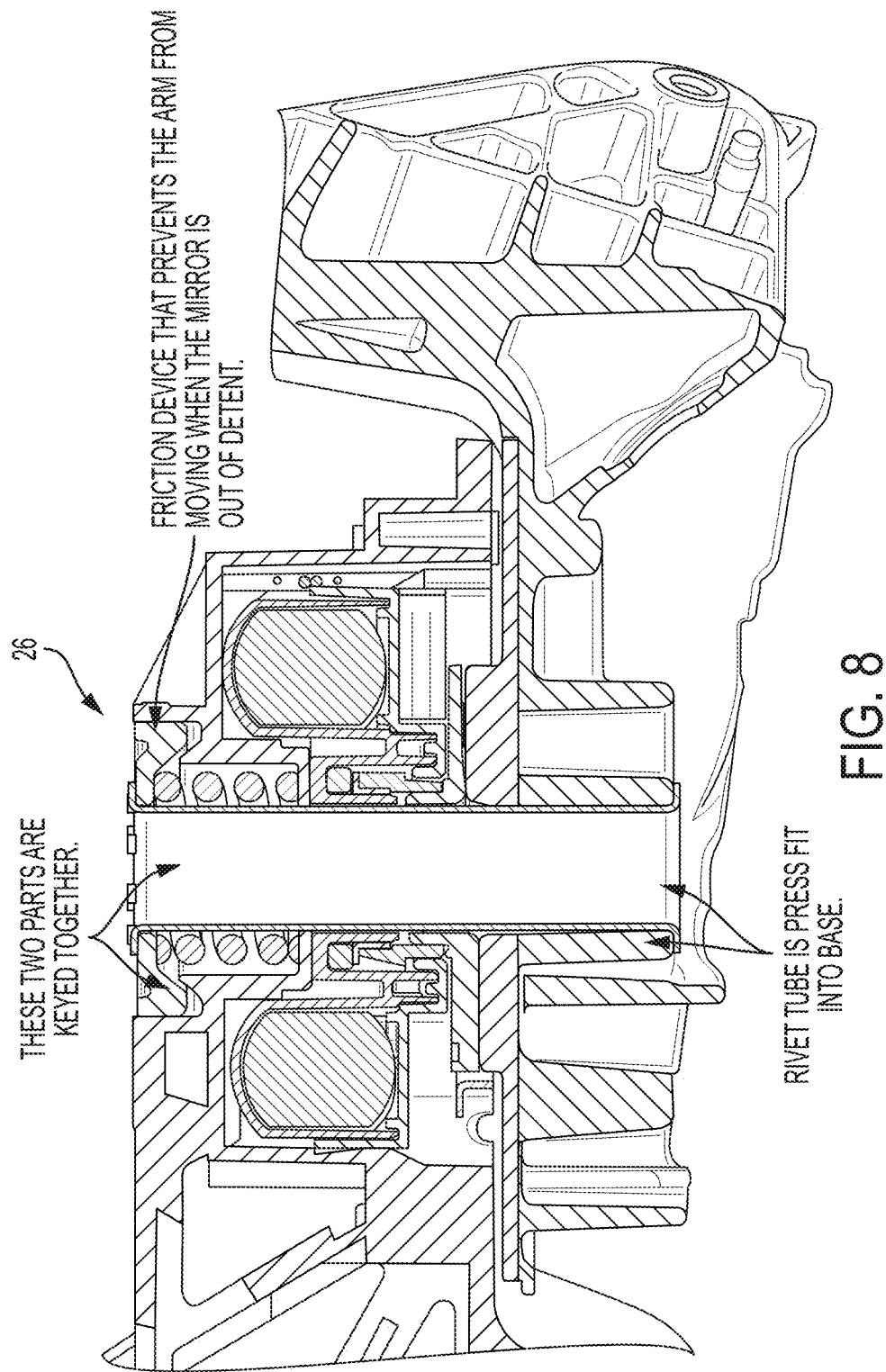
FIG. 8 is a sectional view of a powerfold mirror actuator having a friction device in accordance with the present invention.

Optionally, and with reference to FIG. 8, the powerfold system may include a friction device 26 at the actuator 18. The friction device may comprise any suitable device, such as a mechanical device that holds the location of the pivot arm and mirror head relative to the base when the mirror head is lifted out of the detent or detents. The friction device limits pivotal movement of the mirror head in such situations, but will still allow the mirror head to be rotated by a manual outside force at the mirror head.

When the powerfold mirror is manually adjusted (such as may occur via manual movement of the mirror head by a person manually pivoting the mirror head out of a detent position or by an impact at the mirror head, such as by the mirror head contacting or impacting an object, such as during movement of the vehicle or during movement of an object relative to the vehicle and mirror head, where such contact or impact moves or pivots the mirror head out of a detent position), the detents become disengaged. Assuming the next function after manual adjustment is electrical adjustment, the powerfold mirror and actuator may either (i) re-engage the detents without moving the mirror head or (ii) move the mirror head without immediately re-engaging the detents. In the second case, the detents would eventually re-engage after the mirror head reaches a physical stop (where the mirror head no longer moves). Typically, either of the two scenarios can occur depending on how much friction there is at the different slipping interfaces.

The friction device of the present invention causes the detents to re-engage before the mirror head moves. This is accomplished by adding more friction to the slip interface between the mirror head/arm and the base/rivet tube. The friction device may increase the friction only when a manual adjustment occurs.

Optionally, and with reference to FIGS. 9A and 9B, the powerfold system may include a rearward range sensor 28 at the actuator 18. The rearward range sensor may comprise any suitable sensor, such as a sensor that detects if the mirror head is anywhere rearward of drive position (towards the park or folded position). For example, the rearward range sensor may comprise a hall effect sensor that is mounted at the base and an arc-shaped magnet that is mounted at the arm. When the mirror head is at a rearward position, the sensor may detect the presence of the magnet at or near the sensor, whereas when the mirror head is pivoted to the drive position or forward of the drive position, the magnet is moved away from the sensor and the sensor does not detect its presence. Optionally, and as shown in FIGS. 9A and 9B, the sensor 28 and magnet may be mounted at the base and a steel stamping 29 may be mounted at the arm so that, when the mirror rotates, the stamping travels between the magnet and the sensor.

Figure 10B:
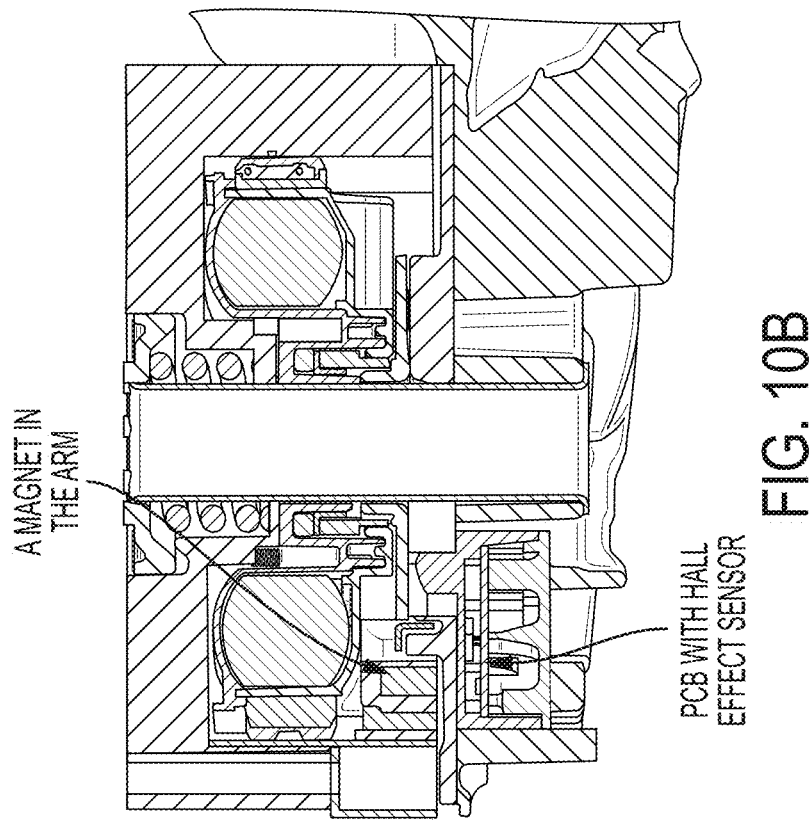
FIGS. 10A and 10B are sectional views of a powerfold mirror actuator having a drive position sensor in accordance with the present invention.
Figure 10A:
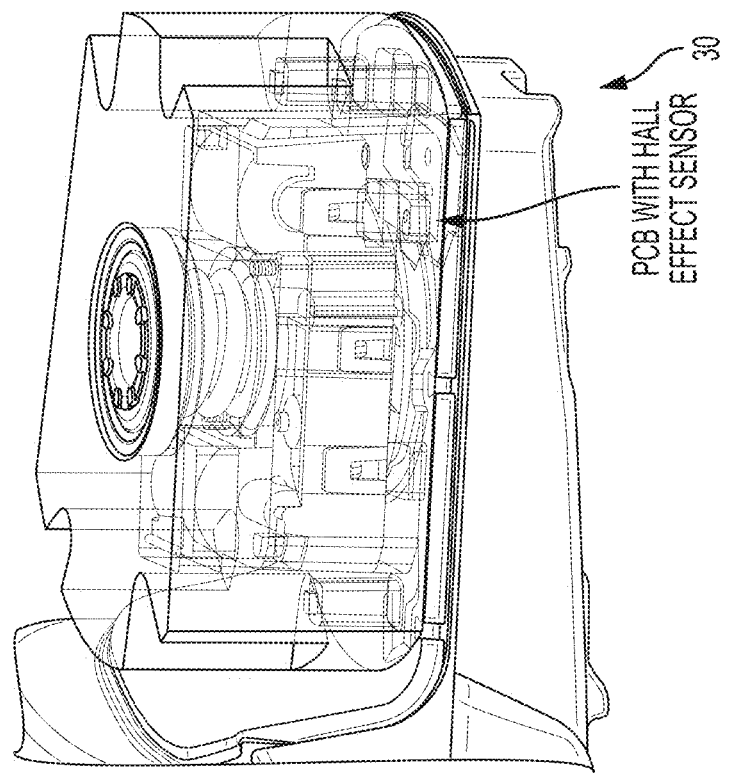
Figure 13:
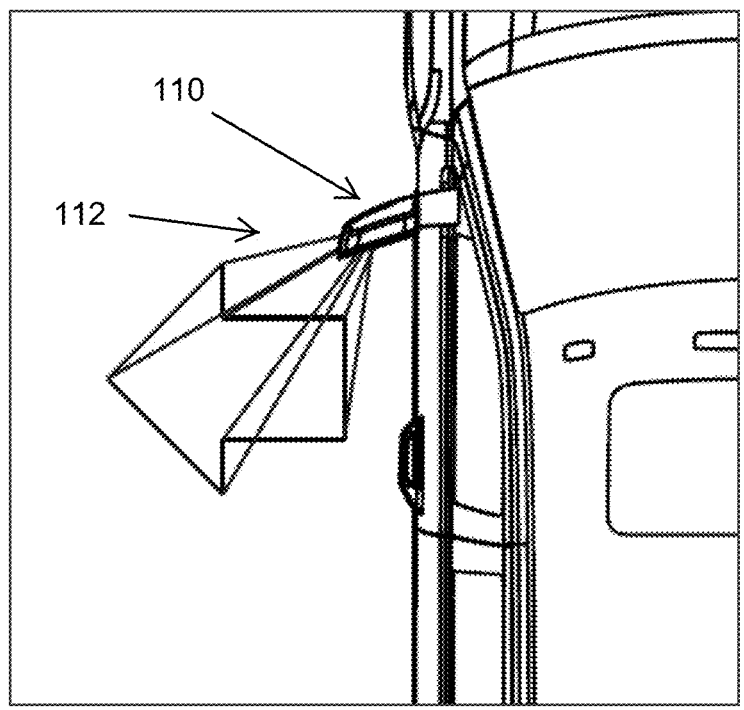
FIG. 13 is a top plan view of the exterior rearview mirror assembly of FIG. 12.
Figure 12:
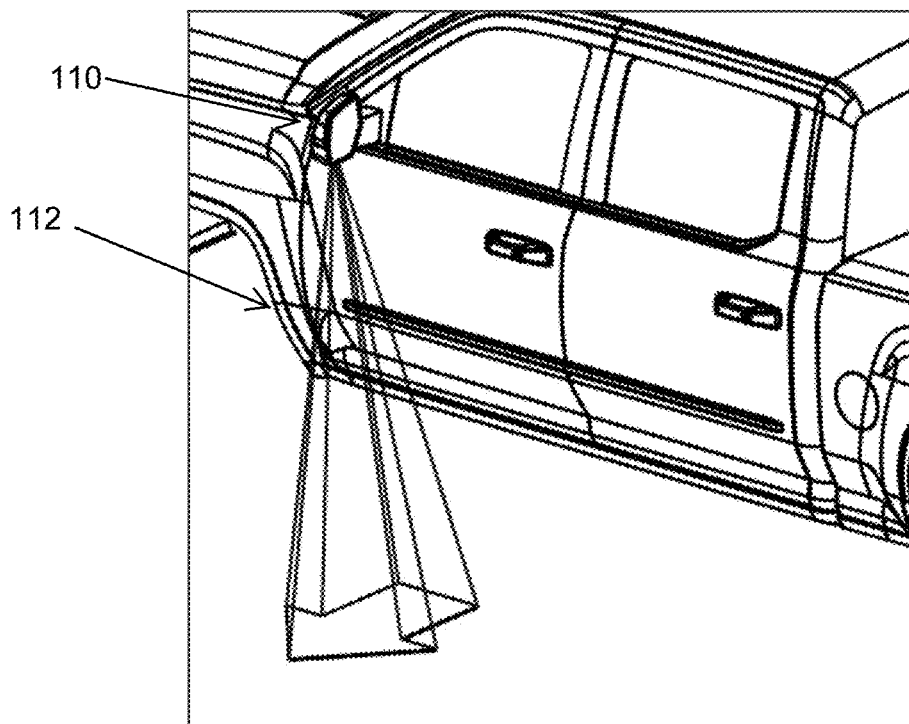
FIG. 12 is a perspective view of another exterior rearview mirror assembly, shown with a projected turn signal indicator in accordance with the present invention.
Figure 14:
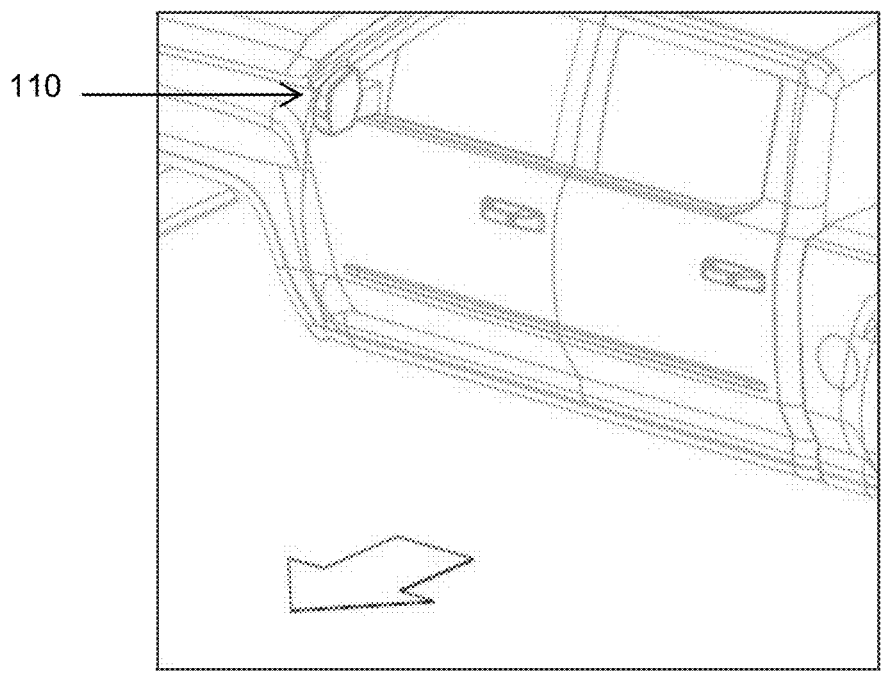
FIG. 14 is another perspective view of the exterior rearview mirror assembly of FIG. 12.
Figure 15:
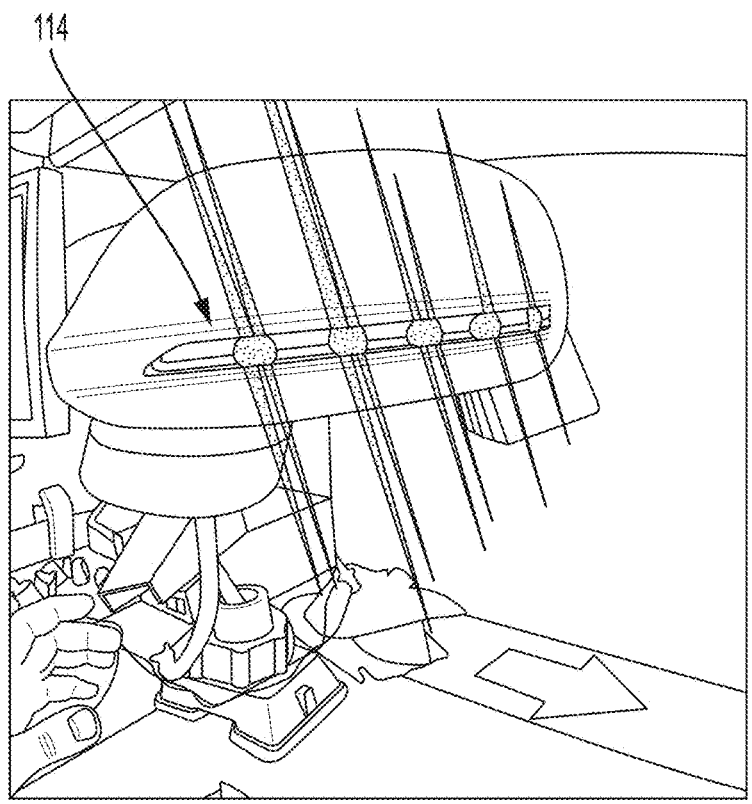
FIG. 15 is another perspective view of the exterior rearview mirror assembly of FIG. 12, shown with a turn signal indicator light at the side of the mirror assembly.

Optionally, and with reference to FIGS. 10A and 10B, the powerfold system may include a drive position sensor 30 at the actuator 18. The drive position sensor may comprise any suitable sensor, such as mechanical switch or hall effect sensor or switch (such as a sensor disposed at a circuit board of the actuator or mirror assembly) that detects when the mirror head is at the drive detent position. When the mirror head is at the drive position, the sensor detects a magnet that is disposed at the arm or mirror head and that is near the sensor when the mirror head is at the drive position and remote from the sensor when the mirror head is not at the drive position.

According to one aspect of the powerfold system of the present invention, the mirror assembly may include a detent sensor 24 and a single powerfold user input or button 22 (disposed in the vehicle and actuatable by a driver of the vehicle when the driver is normally operating the vehicle). Every time the powerfold button is pressed and the mirror head is out of one of the detent positions (as determined by the detent sensor), the mirror head will rotate to the park position to reset the actuator and then go to drive position. This includes when the mirror head is at a forward and out of detent position or between the park and drive detent positions. Thus, if the mirror head is between the park and drive positions and out of detent, the mirror head will move to the park position and then move back towards and to the drive position. Otherwise, the powerfold mirror will function the same as known powerfold mirrors.

Such a powerfold system provides a reduced cost and relatively simple system, which also provides for movement of the mirror head without delay when the user input or button is actuated. The powerfold system makes the assumption that the user wants the mirror to return to the drive position when the mirror head is out of the detent positions (but could instead move or adjust the mirror head towards the park position when the mirror head is out of the detent positions). With this powerfold system of the present invention, the user input may still need to be pressed multiple times to move the mirror head from a "forward in detent" position to the drive detent position. It is envisioned that the system will include communication between the driver and passenger side mirrors so that the mirror heads can stay in sync and are at the same relative positions.

According to another aspect of the powerfold system of the present invention, the mirror assembly may include a detent sensor 24 and a rearward range sensor 28 and a friction device 26 and a single powerfold user input or button 22. In this application, every time the powerfold button is pressed and the mirror head is out of the detent positions (such as may occur via manual movement of the mirror head, such as by a person manually pivoting the mirror head out of a detent position or by an impact at the mirror head, such as by the mirror head contacting or impacting an object, such as during movement of the vehicle or during movement of an object relative to the vehicle and mirror head, so as to move or pivot the mirror head out of a detent position), the actuator will reset the detent without moving the mirror head. Before moving the mirror head, the system will sense if the mirror head is either anywhere rearward of the drive position or in the drive position or forward of the drive position. Depending on the determined mirror head position, the system will take various actions. For example, if the system determines that the mirror head is rearward of the drive position, the actuator will pivot or adjust the mirror head to the drive position, and if the system determines that the mirror head is at the drive position or forward of the drive position, the actuator will pivot or adjust the mirror head to the park position.

Thus, this powerfold system of the present invention may perform as a "one button press" solution for all user scenarios. It is envisioned that the system will include communication between the driver and passenger side mirrors so that the mirror heads can stay in sync and are at the same relative positions.

According to another aspect of the powerfold system of the present invention, the mirror assembly may include a detent sensor 24 and a drive position sensor 30 and a friction device 26 and a single powerfold user input or button 22. In this application, every time the powerfold button is pressed and the mirror head is out of the detent positions, the actuator will reset the detent without moving the mirror head. When the powerfold button is pressed, the actuator will start to move the mirror towards the park position and depending on the scenario the mirror will end up in the drive position or in the park position. For example, when the mirror head is at the drive position (as determined by the drive position sensor), the drive position sensor will be active and the mirror head will rotate to the park position, and when the mirror head is at the park position, the mirror head will rotate towards park and there will be an instant current spike and the mirror will rotate to the drive position. When the mirror head is at a forward position, the mirror head will rotate towards park and the drive position sensor will trigger during the move and when the drive position sensor turns off, the actuator will then reverse its direction and rotate the mirror head back to the drive position. When the mirror head is between the park and drive positions, the mirror head will pivot towards the park position and the current will spike before the drive position sensor is triggered, whereby the mirror may either stay at the park position or go back to the drive position (depending on the particular application and customer preferences of the powerfold system and exterior rearview mirror assembly).

Thus, this powerfold system of the present invention may perform as a "one button press" solution for all user scenarios. Also, this system has a less complex, lower cost, point position sensor compared to the range sensor. It is envisioned that the system will include communication between the driver and passenger side mirrors so that the mirror heads can stay in sync and are at the same relative positions.

According to another aspect of the powerfold system of the present invention, the mirror assembly may include a detent sensor 24 and a drive position sensor 30 and a rearward range sensor 28 and a friction device 26 and a single powerfold user input or button 22. In this application, every time the user input or PF button is pressed and the mirror head is out of the detent positions (such as may occur via manual movement of the mirror head, such as by a person manually pivoting the mirror head out of a detent position or by an impact at the mirror head, such as by the mirror head contacting or impacting an object, such as during movement of the vehicle or during movement of an object relative to the vehicle and mirror head, so as to move or pivot the mirror head out of a detent position), the actuator will reset the detent without moving the mirror head. When the powerfold button is pressed, the system will sense the mirror head location using the three position sensors and will respond accordingly. For example, when the user input is actuated when mirror head is at the drive position, the drive position sensor will be active and the mirror head will rotate to the park position. When the user input is actuated when the mirror head is at the park position, the rearward range sensor will be active and the mirror will rotate to the drive position. When the user input is actuated when the mirror head is at a forward position, neither the drive position sensor nor the rearward range sensor would be active, so the actuator would rotate the mirror head rearward until the rearward range sensor is active and then it would reverse its direction to move the mirror head at the drive position. When the user input is actuated when the mirror head is at a position between the park and drive positions, the rearward range sensor will be active and the actuator will rotate the mirror head to the drive position.

Thus, this powerfold system of the present invention may perform as a "one button press" solution for all user scenarios. Also, this system has a less complex, lower cost, point position sensor compared to the range sensor. It is envisioned that the system will include communication between the driver and passenger side mirrors so that the mirror heads can stay in sync and are at the same relative positions.

According to another aspect of the powerfold system of the present invention, the mirror assembly may include a detent sensor 24 and a drive position sensor 30 and a friction device 26 and two powerfold user inputs or buttons 23. In this application, every time the powerfold button is pressed and the mirror head is out of the detent positions, the actuator will reset the detent without moving the mirror head. When the "MOVE TO DRIVE" powerfold button is pressed, the actuator will start to move the mirror head towards the park position and will complete the movement depending on the particular scenario. For example, when the "move to drive" user input is actuated when the mirror head is at the drive position, the drive position sensor will be active and the actuator will not move the mirror head. When the "move to drive" user input is actuated when the mirror head is at the park position, the actuator will pivot or move the mirror head towards the park position and there will be a current spike and the mirror will rotate to the drive position. When the "move to drive" user input is actuated when the mirror head is at a forward position, the actuator will pivot or move the mirror head towards the park position and the drive position sensor will trigger during the move and when the drive position sensor turns off, the actuator will then reverse its direction and rotate the mirror head back to the drive position. When the "move to drive" user input is actuated when the mirror head is between the park and drive positions, the actuator will move the mirror head towards the park position and the current will spike before the drive position sensor is triggered and the actuator will move the mirror head to the drive position.

Similarly, when the "MOVE TO PARK" powerfold button is pressed, the actuator will start to move the mirror towards the park position and will complete the movement depending on the particular scenario. For example, when the "move to park" user input is actuated when the mirror head is at the drive position, the actuator will rotate the mirror head towards the park position until the motor stalls. When the "move to park" user input is actuated when the mirror head is at the park position, the actuator will rotate the mirror head towards the park position until motor stalls. When the "move to park" user input is actuated when the mirror head is at a forward position, the actuator will rotate the mirror head towards the park position until motor stalls. When the "move to park" user input is actuated when the mirror head is between the park and drive positions, the actuator will rotate the mirror head towards the park position until motor stalls.

Thus, this powerfold system of the present invention may perform as a "one button press" (of the selected button for the desired final position of the mirror head) solution for all user scenarios. Also, this system has a less complex, lower cost, point position sensor compared to the range sensor. Another benefit of this system is that the driver side and passenger side mirrors will automatically sync together.

According to another aspect of the powerfold system of the present invention, the mirror assembly may include a detent sensor 24 and a rearward range sensor 28 and a friction device 26 and two powerfold user inputs or buttons 23. In this application, every time the powerfold button is pressed and the mirror head is out of the detent positions, the actuator will reset the detent without moving the mirror head. When the "MOVE TO DRIVE" powerfold button is pressed, the actuator will move the mirror head depending on the particular scenario. For example, when the "move to drive" user input is actuated when the mirror head is at the drive position, the rearward range sensor will not be active so the actuator will rotate the mirror head towards the park position until the rearward range sensor is active and then will rotate the mirror head back to the drive position. When the "move to drive" user input is actuated when the mirror head is at the park position, the rearward range sensor will be active so the actuator will pivot or move the mirror head towards the drive position. When the "move to drive" user input is actuated when the mirror head is at a forward position, the rearward range sensor will not be active so the actuator will rotate the mirror head towards park just until the rearward range sensor is active and then rotate the mirror head back to the drive position. When the "move to drive" user input is actuated when the mirror head is between the park and drive positions, the rearward range sensor will be active and the actuator will move the mirror head to the drive position.

Similarly, when the "MOVE TO PARK" powerfold button is pressed, the actuator will start to move the mirror towards the park position and will complete the movement depending on the particular scenario. For example, when the "move to park" user input is actuated when the mirror head is at the drive position, the actuator will rotate the mirror head towards the park position until the motor stalls. When the "move to park" user input is actuated when the mirror head is at the park position, the actuator will rotate the mirror head towards the park position until motor stalls. When the "move to park" user input is actuated when the mirror head is at a forward position, the actuator will rotate the mirror head towards the park position until motor stalls. When the "move to park" user input is actuated when the mirror head is between the park and drive positions, the actuator will rotate the mirror head towards the park position until motor stalls.

Thus, this powerfold system of the present invention may perform as a "one button press" (of the selected button for the desired final position of the mirror head) solution for all user scenarios. Another benefit of this system is that the driver side and passenger side mirrors will automatically sync together.

Thus, the powerfold systems of the present invention provide various means for adjusting the mirror head to the park position or drive position. The chart of FIG. 11 shows the various elements of each system and the adjustments made by the system responsive to the user input and initial position of the mirror head when the user input is actuated.

Optionally, an exterior rearview mirror assembly of the present invention may include a turn signal indicator or the like for indicating to drivers of other vehicles that the driver of the equipped vehicle has actuated a turn signal of the vehicle. The turn signal indicator of the exterior rearview mirror assembly may utilize aspects of the mirror systems described in U.S. Pat. Nos. 6,198,409; 5,929,786 and 5,786,772, and/or International Publication Nos. WO 2007/005942 and/or WO 2008/051910, which are hereby incorporated herein by reference in their entireties. The signal indicator or indication module may include or utilize aspects of various light modules or systems or devices, such as the types described in U.S. Pat. Nos. 7,581,859; 6,227,689; 6,582,109; 5,371,659; 5,497,306; 5,669,699; 5,823,654; 6,176,602 and/or 6,276,821, and/or U.S. patent application Ser. No. 13/891,619, filed May 10, 2013 and published Sep. 19, 2013 as U.S. Publication No. US-2013-0242586, and/or Ser. No. 13/249,433, filed Sep. 30, 2011, now U.S. Pat. No. 8,764,256, and/or International Publication No. WO 2006/124682, and/or U.S. provisional applications, Ser. No. 61/970,582, filed Mar. 26, 2014, Ser. No. 61/939,766, filed Feb. 14, 2014, and Ser. No. 61/937,138, filed Feb. 7, 2014, which are hereby incorporated herein by reference in their entireties.

For example, and with reference to FIGS. 12-15, the exterior rearview mirror assembly 110 may include a projection turn signal indicator 112 that projects a turn signal icon or arrow onto the ground at or near the side of the vehicle at which the mirror assembly is mounted. The projection signaling of the present invention uses a projection logo light module with a colored illumination source (such as a colored light emitting diode (LED), such as an amber colored LED or the like) in conjunction with the vehicle's turn signal to display an arrow (or other suitable icon or symbol) on the ground adjacent to vehicle. The turn signal indicator or module thus may produce a large blinking symbol at the ground, which may enhance visibility of the turn signal indication to vehicles, cyclists, and pedestrians who may be located in the blind spot of the signaling or equipped vehicle. The mirror assembly may also include a turn signal indicator and/or spot light and/or multifunction lighting module 114 (FIG. 15), such as by utilizing aspects of the mirror systems described in U.S. patent application Ser. No. 13/891,619, filed May 10, 2013 and published Sep. 19, 2013 as U.S. Publication No. US-2013-0242586, and/or Ser. No. 13/249,433, filed Sep. 30, 2011, now U.S. Pat. No. 8,764,256, and/or U.S. provisional applications, Ser. No. 61/970,582, filed Mar. 26, 2014, Ser. No. 61/939,766, filed Feb. 14, 2014, and Ser. No. 61/937,138, filed Feb. 7, 2014, which are hereby incorporated herein by reference in their entireties, and the light module may operate in tandem with the projection light.

The projection icon or logo light module can also be used in conjunction with brake lights, hazards, reverse lights, or other vehicle indicator systems to increase signal visibility. Optionally, the symbol or icon that is projected onto the ground may be adjusted depending on the input. For example, a red stop indication may be projected onto the ground when the brake lights of the vehicle are actuated.

Optionally, the mirror assembly may include a turn signal indicator module, which may also provide a blind zone indicator function. For example, and with reference to FIGS.

Figure 16:
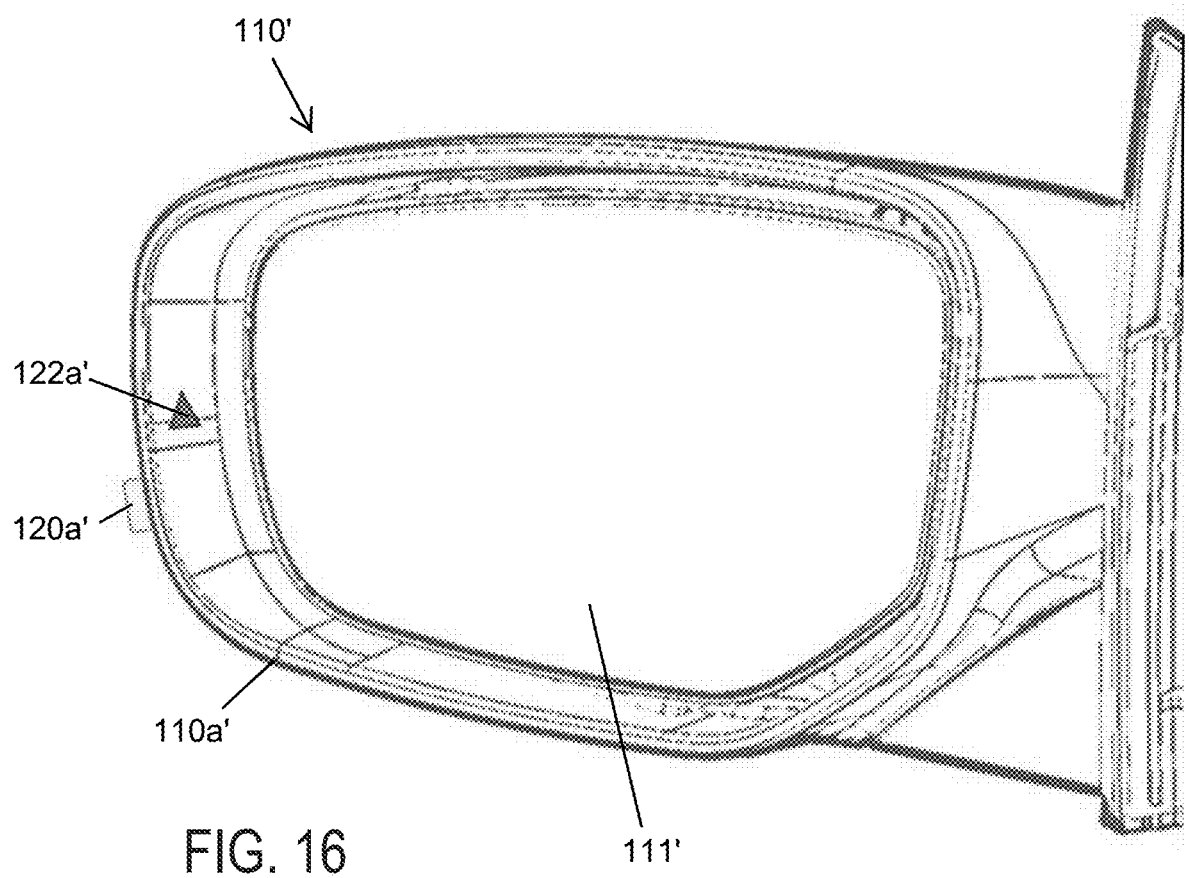
FIG. 16 is a perspective view of another exterior rearview mirror assembly, with a turn signal indicator and blind spot indicator module in accordance with aspects of the present invention.
Figure 17:
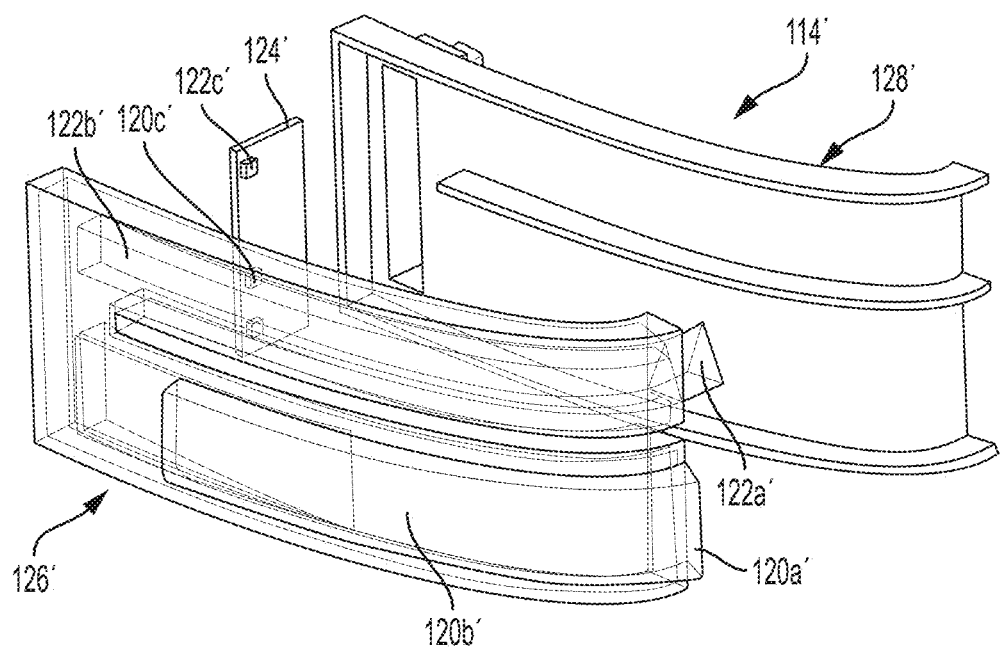
FIG. 17 is an exploded perspective view of the turn signal indicator and blind spot indicator module of the mirror assembly of FIG. 16.
Figure 18:
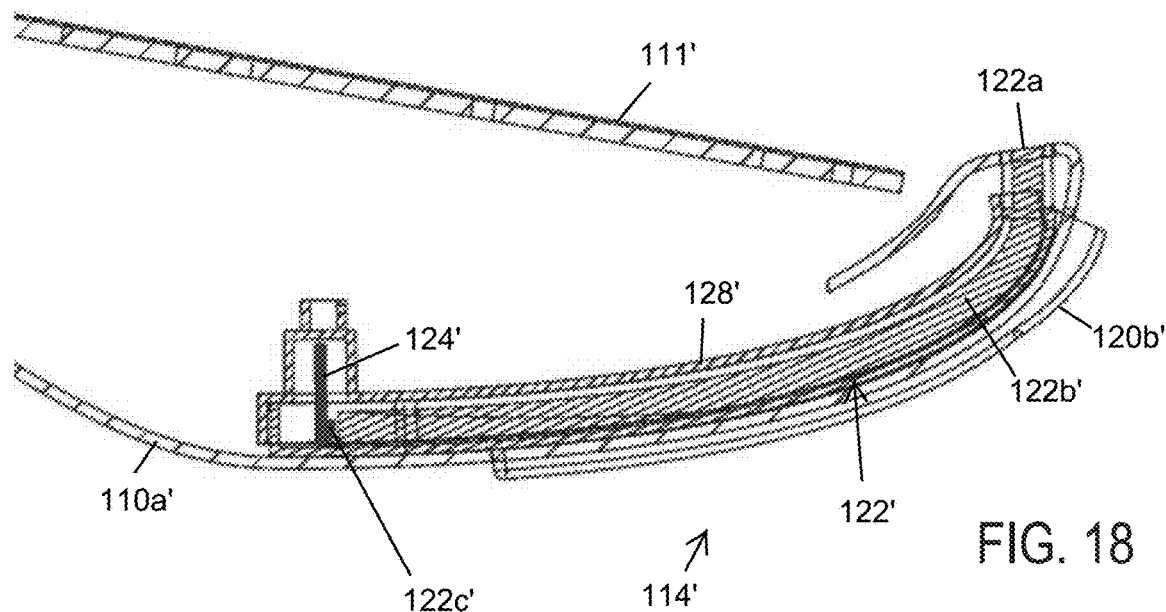
FIG. 18 is a sectional view of the turn signal indicator and blind zone indicator module of FIG. 17, taken along the blind zone indicator portion of the module.
Figure 19:
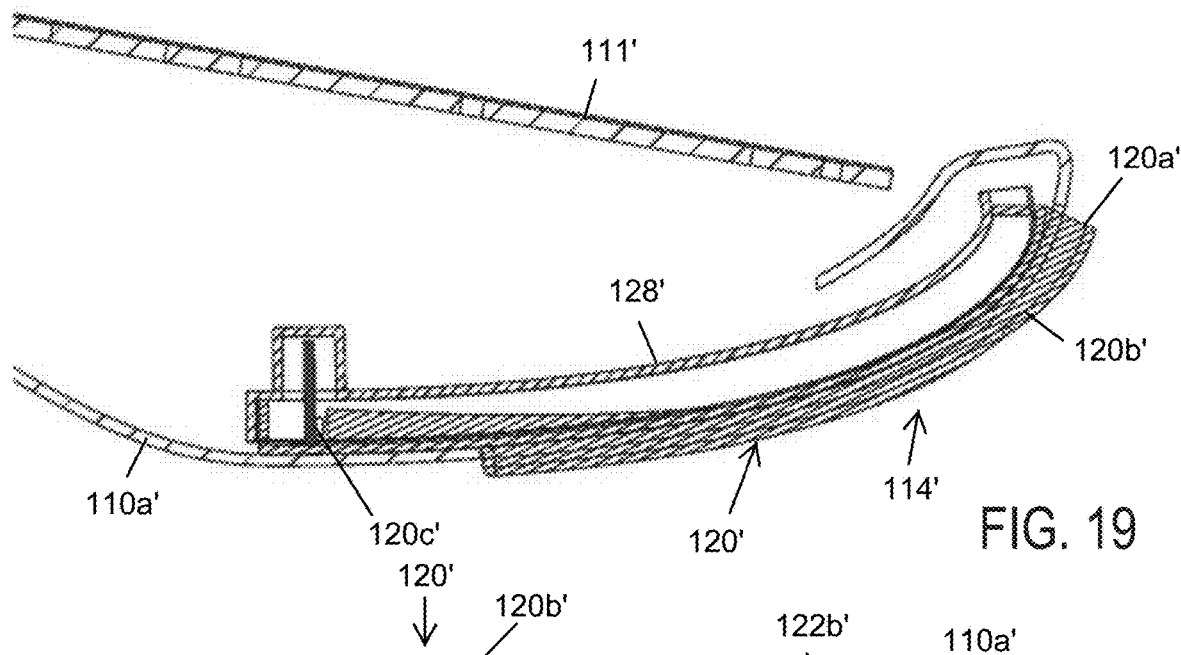
FIG. 19 is a sectional view of the turn signal indicator and blind zone indicator module of FIG. 17, taken along the turn signal indicator portion of the module.

16-20, a turn signal indicator and blind zone indicator module 114' may be disposed at an exterior rearview mirror assembly 110'. The module 114' includes a turn signal indicator portion 120', which is operable to emit a turn signal indication 120a', and a blind zone indicator portion 122', which is operable to emit a blind zone indication 122a', with both indications being viewable at a rear portion of the mirror assembly, such as shown in FIG. 16. The turn signal indicator portion 120' and the blind zone indicator portion 122' are part of a single module 114'. Typically, an exterior mirror that is equipped with a turn signal (TS) and blind zone indicator (BZI) contains two separate modules. The TS/BZI combined module incorporates both functions into one module, utilizing only one printed circuit board (PCB) 124' and a single cover 126' that is disposed at or attached at a casing or enclosure 128' (FIG. 17). Thus, the module minimizes the amount of components, connectors and assembly processes.

The TS/BZI combined module 114' uses light guides, and uses a single light source location that is not visible from outside the mirror, with the light guide directing or guiding the light to its intended viewing area. With turn signal indicators, much of the light is directed towards an exit at the outboard end of the module, but there is also a feature along the length of the exposed light guide 120b' that scatters the light outward (so as to be viewable from in front of the mirror assembly and vehicle and at the side of the mirror assembly and vehicle). Such a light guide 120b' may make the whole light guide emit light uniformly from an outward appearance.

The TS portion 120' of the TS/BZI combined module 114' may comprise any suitable light guide turn signal design, with a length of visible light guide 120b' and an exit 120a' at the outboard rearward end of the mirror. The BZI portion 122' of the TS/BZI combined module 114' has a light guide that, unlike the TS light guide, may remain hidden behind the mirror housing 110a'. Instead of exiting at the outboard side of the mirror, the BZI light guide end 122a' is disposed at and/or protrudes through the mirror bezel (or emits light through a window at the mirror bezel or casing or reflective element 111'), aimed at least partially towards the driver. This causes the BZI symbol to appear next to the mirror glass in the driver's view, such as shown in FIG. 16. The BZI symbol can have custom shapes or logos by either changing the cross section of the BZI light guide protrusion, or by using a mask at the end of the protrusion, or any other suitable means.

The TS and BZI light sources 120c', 122c' are disposed at or on the same PCB 124' (FIG. 17), but are able to be operated independently. Different color lights or filters can be used to help differentiate between the two emitted lights, as they may both be visible to the driver of the vehicle.

Figure 20:
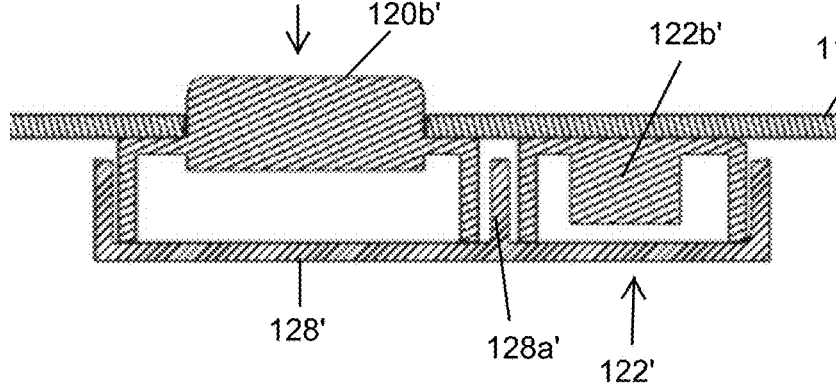
FIG. 20 is a sectional view of the turn signal indicator and blind zone indicator module of FIG. 17, taken through the module and mirror casing and showing the turn signal indicator portion exposed at the mirror casing and the blind zone indicator portion behind the mirror casing.
Figure 22:
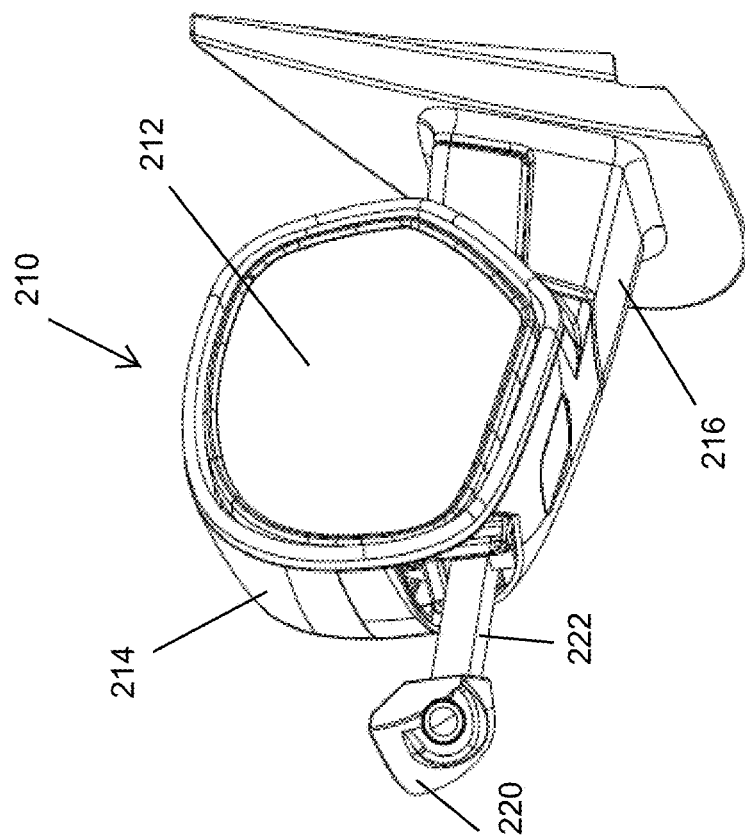
FIG. 22 is another perspective view of the exterior rearview mirror assembly of FIG. 21, shown with the camera extended laterally outward from the mirror head in accordance with the present invention.

As shown in FIG. 17, the two light guides 120b', 122b' may be combined in a single cover or lens 126' (such as a transparent cover or lens) to minimize assembly processes. The module housing or casing 128' may have a rib 128a' between the two light guide portions to limit or minimize or substantially preclude light leaking from one light guide or function into the other. As shown in FIG. 20, when the module 114' is disposed at an exterior rearview mirror assembly 110', the TS light guide portion 120b' protrudes through and/or is visible at the mirror casing 110a', while the BZI light guide portion 122b' is disposed behind and is hidden by the mirror casing 110a'. Thus, light emitted by the light source 120c' of the TS indicator portion 120' may be viewable along the light guide portion 120b' and at the end 120a' of the light guide portion 120b', while light emitted by the light source 122c' of the BZI indicator portion 122' may be viewable only at the end 122a' of the light guide portion 122b', such as at the inner surface of the mirror casing 110a' or at the reflective element 111' or the like, depending on the particular application of the light module 114'.

Figure 21:
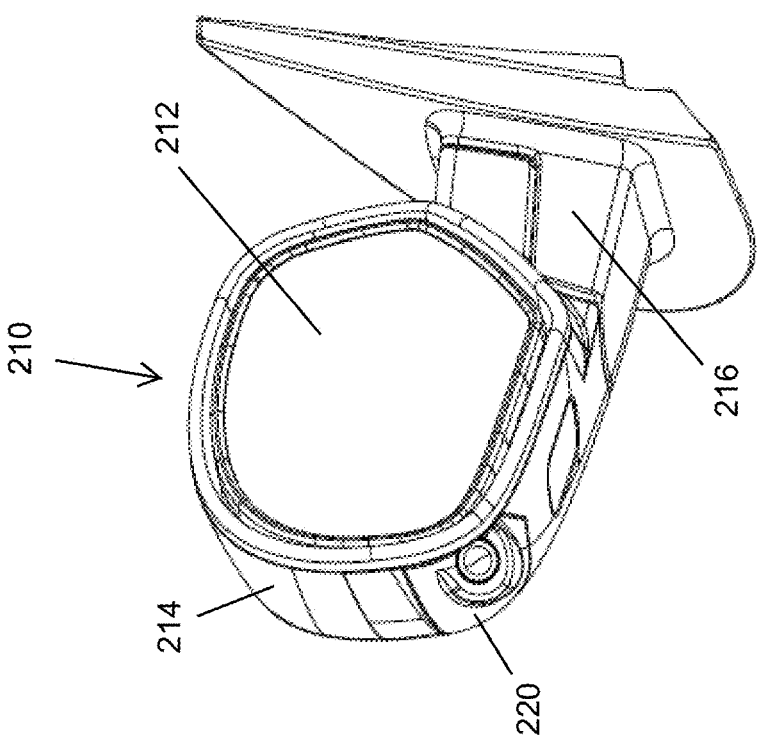
FIG. 21 is a perspective view of another exterior rearview mirror assembly of the present invention, having a camera disposed thereat.
Figure 23:
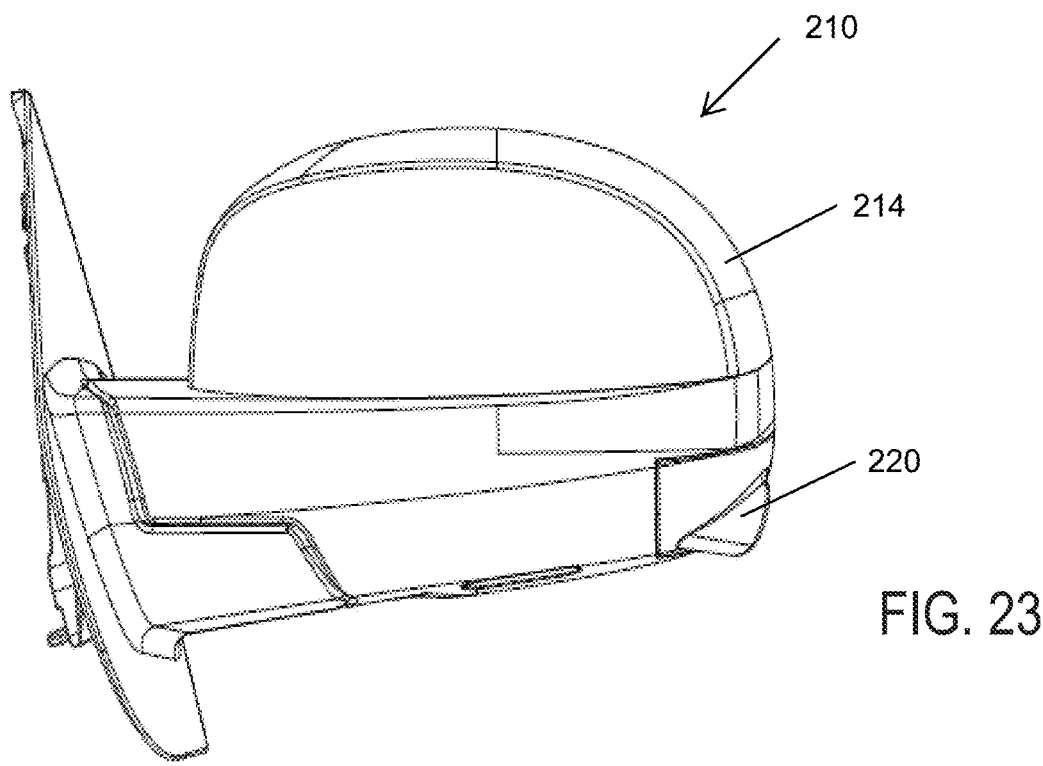
FIG. 23 is a rearward viewing elevation of the exterior rearview mirror assembly of FIG. 21.
Figure 24:
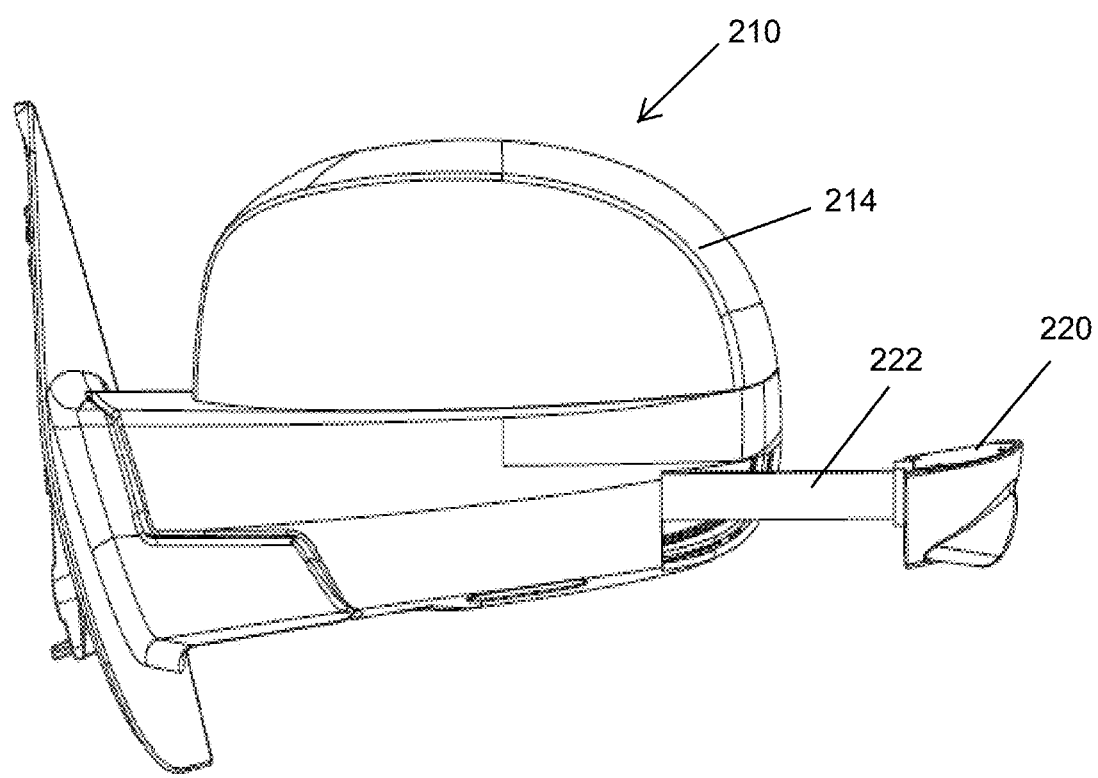
FIG. 24 is a rearward viewing elevation of the exterior rearview mirror assembly of FIG. 22.
Figure 25:
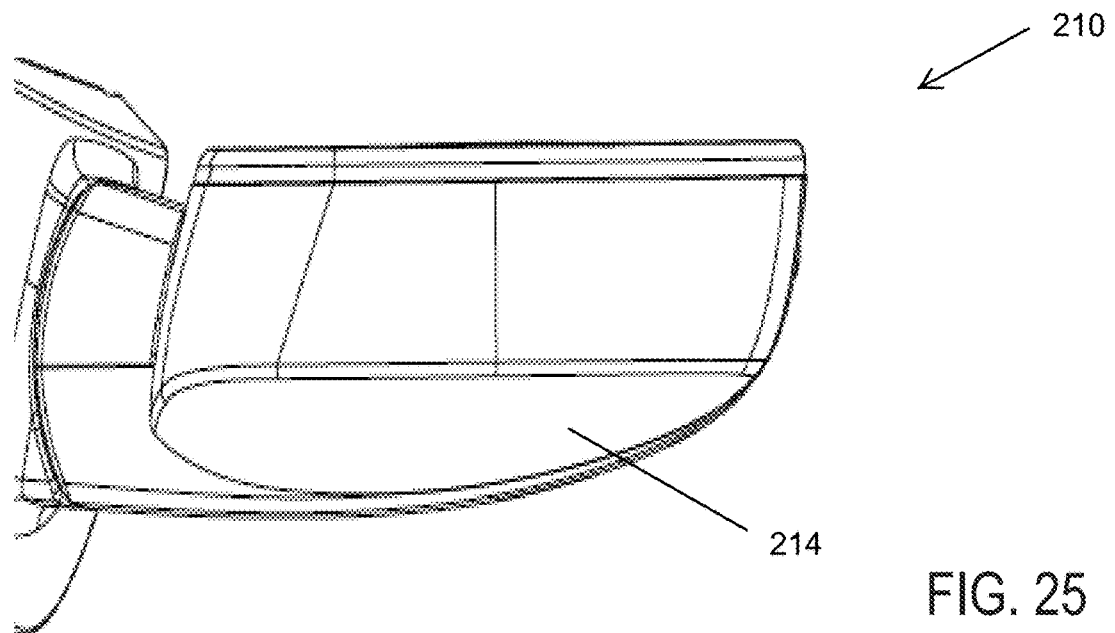
FIG. 25 is a top plan view of the exterior rearview mirror assembly of FIG. 21.
Figure 26:
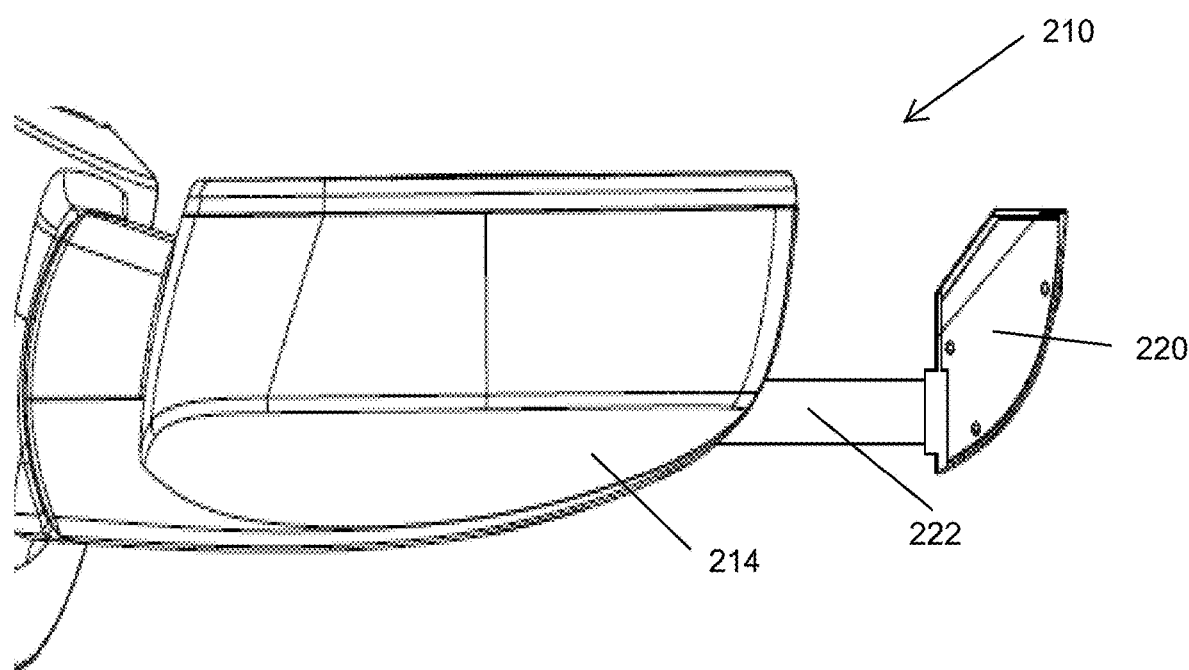
FIG. 26 is a top plan view of the exterior rearview mirror assembly of FIG. 22.
Figure 27:
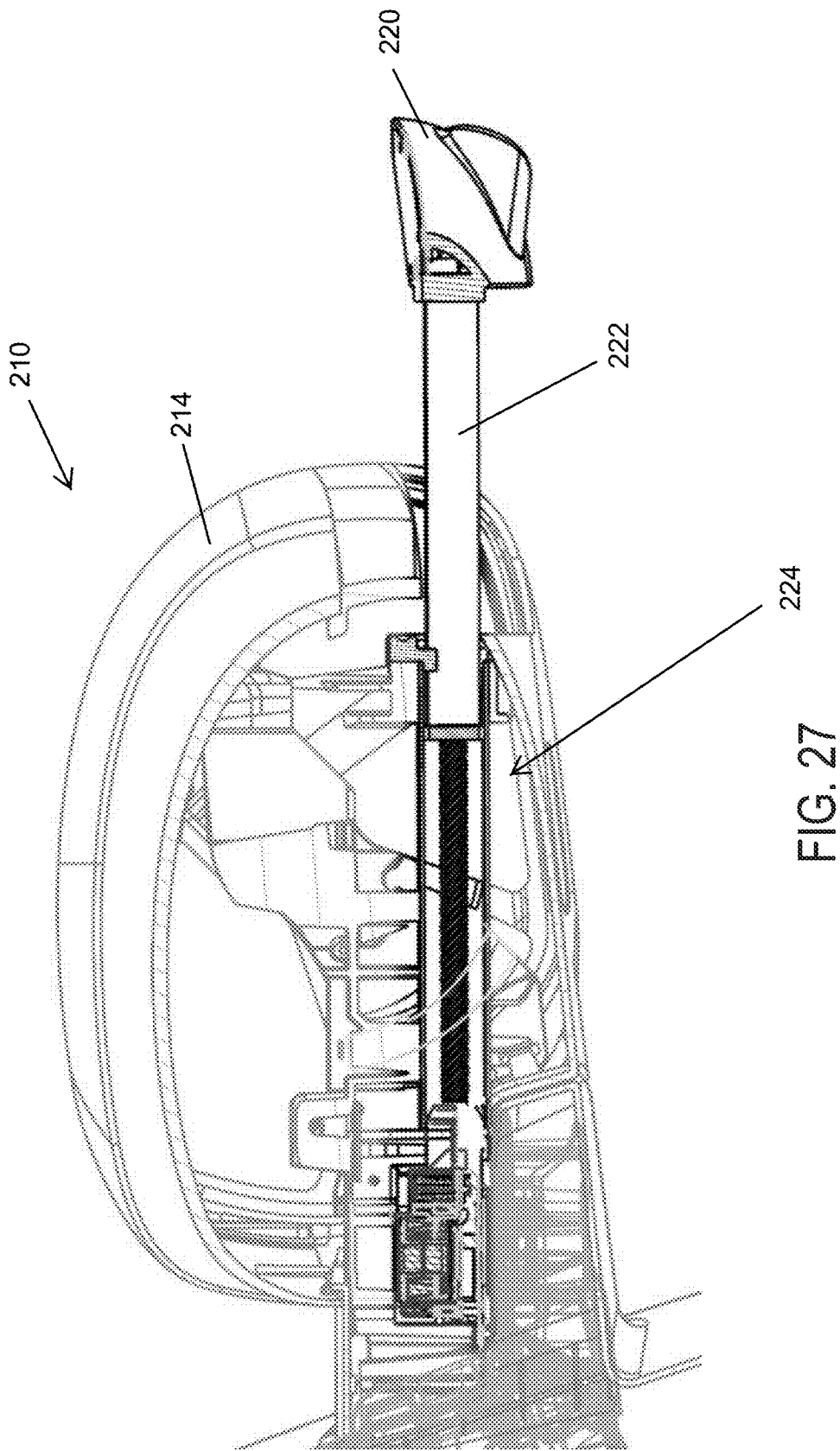
FIG. 27 is a rearward viewing elevation and partial sectional view of the exterior rearview mirror assembly of FIG. 22.
Figure 28:
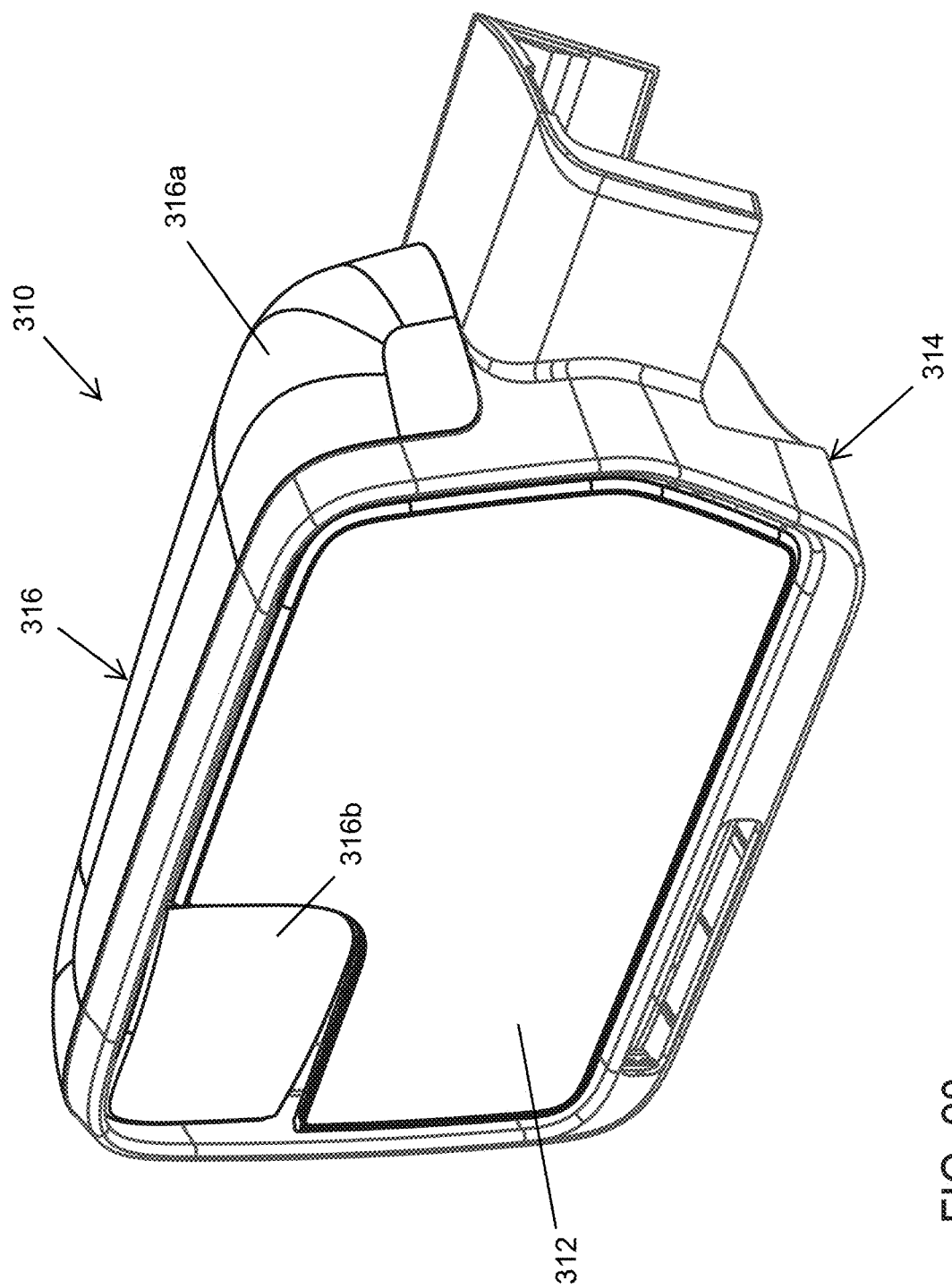
FIG. 28 is a perspective view of another exterior rearview mirror assembly, shown with a plastic cap spotter portion in accordance with the present invention.
Figure 29:
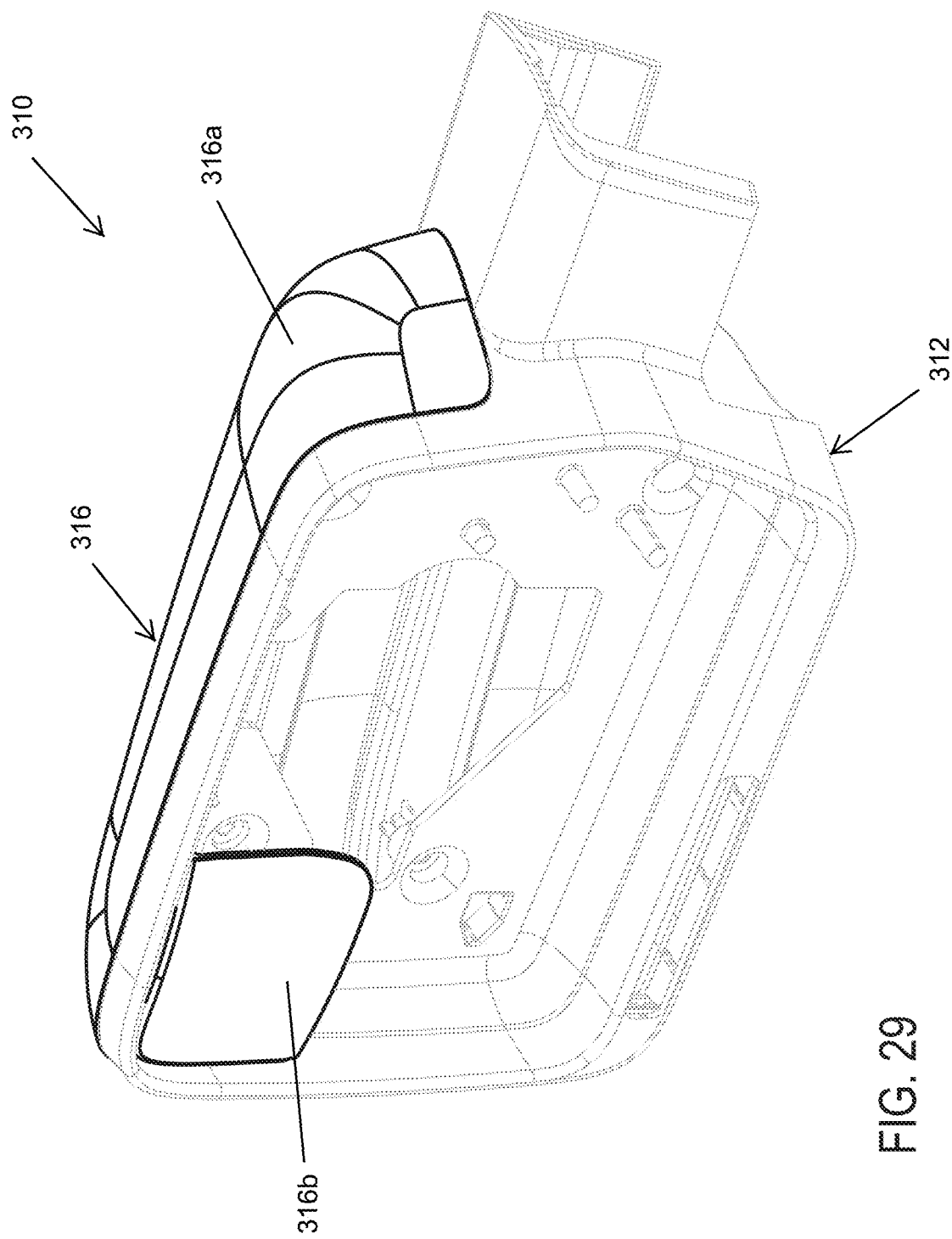
FIG. 29 is another perspective view of another exterior rearview mirror assembly of FIG. 28, shown with the principal reflective element removed.
Figure 30:
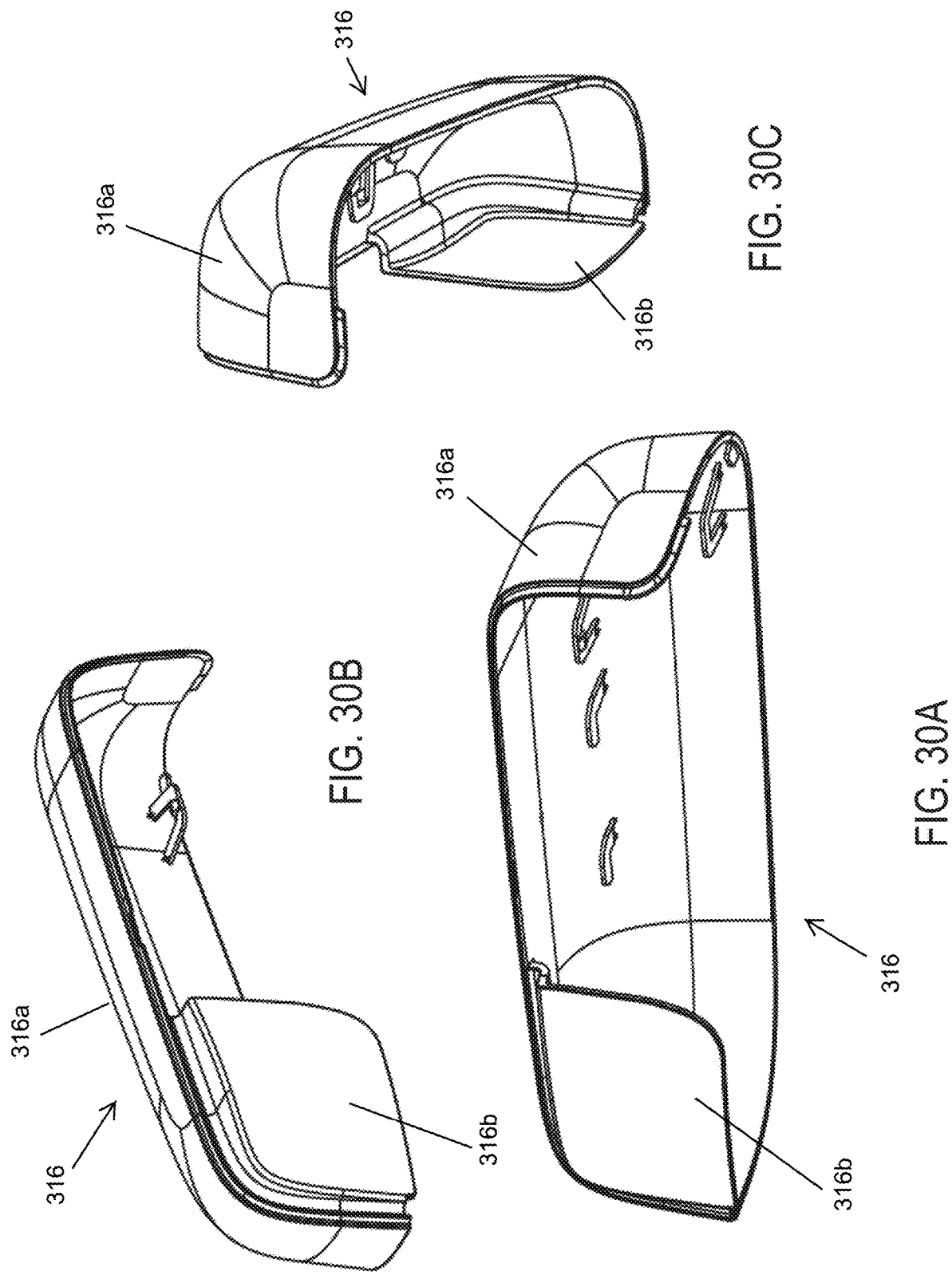
FIGS. 30A-C are perspective views of the plastic cap spotter portion of the exterior rearview mirror assembly of FIG. 28.
Figure 31:
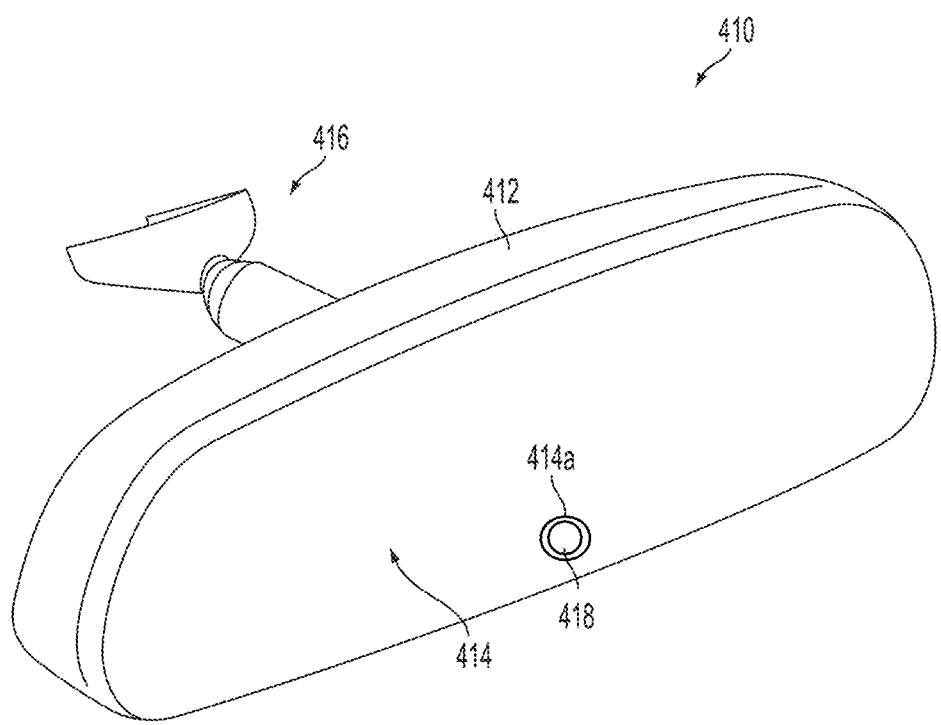
FIG. 31 is a perspective view of an interior rearview mirror assembly of the present invention, having a reflective element with a user input or button that protrudes at least partially through the glass of the reflective element in accordance with the present invention.

Optionally, an exterior rearview mirror assembly may include an imaging sensor (such as a sideward and/or rearward facing imaging sensor or camera that has a sideward/rearward field of view at the side of the vehicle at which the exterior mirror assembly is mounted) that may be part of or may provide an image output for a vehicle vision system, such as a lane departure warning system or object detection system or blind zone alert system or surround view vision system other vehicle vision system or the like, and may utilize aspects of various imaging sensors or imaging array sensors or cameras or the like. Optionally, the camera may be adjustably mounted at the mirror assembly and may extend and retract relative to the mirror head to provide an adjustable and enhanced rearward field of view of the camera. For example, and with reference to FIGS. 21-27, an exterior rearview mirror assembly 210 includes a mirror reflective element 212 received in and/or supported at or by a mirror shell or casing or head portion 214, which is attached at a mounting arm or base 216 at the side of the vehicle. A camera module 220 is disposed at the mirror casing 214 and is adjustably disposed thereat and is adjustable between a retracted position (FIGS. 21, 23 and 25) and an extended position (FIGS. 22, 24, 26 and 27).

The camera mirror assembly of the present invention provides reduced wind drag and limits the need for foldaway mirrors on a vehicle. Optionally, and desirably, the camera mirror assembly of the present invention may be utilized on a type of vehicle that would be used for towing a trailer. Special towing mirrors are usually needed for such cases because the trailer is often wider than the towing vehicle and the driver needs to be able to see around the trailer.

In order to provide the required field of view around a trailer that is towed by the vehicle, the camera may have an alternate mounting position that brings the camera lens outside the width of the trailer. This may be accomplished by an interchangeable camera mount, or by providing an extendable or telescoping mount or arm 222 in the mirror housing that allows for movement of the camera to a trailer towing position (FIGS. 22, 24, 26 and 27).

In the case of an interchangeable camera mount, the camera may be mounted in a normal driving position on the mirror housing when the vehicle is not towing a trailer. To prepare the vehicle for towing, the camera can be re-mounted on the mirror housing using an alternative camera mounting apparatus, or a separate camera with such an extended mounting apparatus may be substituted for the standard camera.

In applications where sufficient space is available in the design, a camera extension mechanism 224 (FIG. 27) may be employed that allows the camera to be moved from the normal inboard position to the towing position without changing the mounting apparatus. The camera movement may be accomplished manually, or may be powered by a motor and drive mechanism. Such a mechanism may be similar to that used to extend known towing mirrors. However, because the camera is smaller and lighter than a typical towing mirror, the extension mechanism can be potentially be made lighter and cost less.

The extension mechanism may comprise any suitable means for moving the camera between the retracted state (where the outer surface of the camera module may generally correspond with the outer surface of the mirror casing around where the camera is disposed) and the extended state. For example, the extension mechanism may comprise a telescoping arm or a rack and pinion extension mechanism or the like, such as by utilizing aspects of the systems described in U.S. Pat. Nos. 7,370,983 and/or 6,690,268, and/or U.S. Publication No. US-2006-0050018, which are hereby incorporated herein by reference in their entireties.

The camera may be extended and retracted responsive to a user input (such as a button or the like disposed in the vehicle) that is actuatable by the driver of the vehicle when the driver is normally operating the vehicle. For example, when the driver needs or wants to see further around the towed trailer (or other object or obstacle at or near the rear of the vehicle), the driver can actuate the user input, whereby the camera will extend laterally outwards from the mirror head and whereby a display in the vehicle will display video images captured by the camera for viewing by the driver of the vehicle while normally operating the vehicle.

When the camera is retracted (such as when the vehicle is parked or turned off or responsive to the user input or other user input or the like), the display may continue to display images captured by the camera. Optionally, the display will no longer display the captured images captured by the mirror camera when the camera is retracted.

Optionally, the camera may rotate about the longitudinal axis of the extension arm to provide an enhanced downward field of view of the camera, such as for use in bird's-eye view or surround view vision systems or the like, such as of the types discussed below. The extension and/or pivoting may be done responsive to a user input or responsive to the bird's-eye view display system operating, such as when the driver shifts the vehicle into reverse gear.

Optionally, an exterior rearview mirror assembly of the present invention may include a spotter mirror element to provide a wide angle rearward field of view to the driver of the vehicle equipped with the mirror assembly. The spotter mirror element may utilize aspects of the mirrors described in U.S. Pat. Nos. 7,255,451; 7,195,381; 6,717,712; 7,126,456; 6,315,419; 7,097,312; 6,522,451; 6,315,419; 5,080,492; 5,050,977; 5,033,835; 8,021,005; 7,934,844; 7,887,204; 7,824,045 and 7,748,856, which are hereby incorporated herein by reference in their entireties.

Optionally, the spotter mirror may comprise a mirror element that is separate from the principal mirror reflective element, and the spotter mirror may be fixedly disposed relative to the mirror casing. For example, and with reference to FIGS. 28-30C, an exterior rearview mirror assembly 310 includes a mirror reflective element 312 adjustably received in and/or supported at or by a mirror shell or casing or head portion 314, which is attached at a mounting arm or base at the side of the vehicle. A spotter mirror cap element or skull cap spotter 316 includes a mirror casing portion 316a and a spotter mirror element portion 316b. The mirror casing portion 316a is configured to attach at the mirror assembly and may replace a typical or known mirror casing portion. When so attached, the spotter mirror element portion 316b is disposed at a corner region of the reflective element 312, which may have its corner region cut away or removed to provide clearance for the spotter element 316b when the reflective element 312 is adjusted relative to the mirror casing (such as via a mirror actuator in the mirror casing).

The skull cap spotter element of the present invention thus removes the separate glass spotter from the reflective element and incorporates a spotter element into a one-piece skull cap/spotter combination. The cap and spotter may comprise an integrally formed or molded plastic element, and may be coated with a reflective coating, such as a chrome coating or the like. The skull cap plastic spotter thus is a single piece of chromed plastic that combines the chrome skull cap of the mirror housing with a chromed plastic spotter. The combined skull cap and spotter unit provides a chrome accent on the front of the housing of the mirror, as well as a view of the vehicle's blind spot from the rear facing side of the mirror assembly. The skull cap plastic spotter may be integrated into the mirror assembly by fitting underneath, over, or by replacing the upper, outer corner of the bezel. The mirror assembly may be modified to allow assembly of the skull cap plastic spotter by removing the glass spotter (if the mirror has one) and optionally removing or not including the corner section of the mirror reflective element that may typically support a glass spotter element.

Optionally, the exterior mirror element of a mirror assembly may include heater pad or film or element at a rear surface of the mirror reflective element. The heater pad or element at the rear surface of the glass substrate may comprise a mirror defrost/demisting heater and may provide an anti-fogging of de-fogging feature to the exterior mirror assembly, and may utilize aspects of the heater elements or pads described in U.S. Pat. Nos. 8,058,977; 7,400,435; 5,808,777; 5,610,756 and/or 5,446,576, and/or U.S. patent applications, Ser. No. 11/779,047, filed Jul. 17, 2007, and published Jan. 17, 2008 as U.S. Pat. Publication No. 20080011733, and/or Ser. No. 13/111,407, filed May 19, 2011 and published Nov. 24, 2011 as U.S. Publication No. US-2011-0286096, which are hereby incorporated herein by reference in their entireties. The heater element may include electrical contacts that extend rearward therefrom and through an aperture of attaching portion of back plate for electrical connection to a wire harness or connector of the mirror assembly, or the back plate and/or heater pad may include suitable electrical connectors and connections incorporated therein (such as by utilizing aspects of the mirror assembly described in U.S. Pat. No. 7,400,435, which is hereby incorporated herein by reference in its entirety) for electrically connecting the heater pad (or other suitable electrical connectors may be utilized, such as electrical leads or wire harnesses or pigtails or other separate connectors or cables or the like). Optionally, the heater pad may comprise a screen printed heater pad. For example, the heater pad can be printed on the back of the mirror reflective element (such as at the fourth or rear surface of the rear substrate). Such coatings may be printed and then cured at around 120 degrees C. or lower, making this process compatible with already formed laminate type EC mirror elements, such as those described in U.S. Pat. No. 5,724,187, which is hereby incorporated herein by reference in its entirety. This would make it compatible with EC mirrors.

Optionally, the mirror assembly may include a blind spot indicator and/or a turn signal indicator, such as an indicator or indicators of the types described in U.S. Pat. Nos. 6,198,409; 5,929,786 and 5,786,772, and/or International Publication Nos. WO 2007/005942 and/or WO 2008/051910, which are hereby incorporated herein by reference in their entireties. The signal indicator or indication module may include or utilize aspects of various light modules or systems or devices, such as the types described in U.S. Pat. Nos. 7,581,859; 6,227,689; 6,582,109; 5,371,659; 5,497,306; 5,669,699; 5,823,654; 6,176,602 and/or 6,276,821, and/or International Publication No. WO 2006/124682, which are hereby incorporated herein by reference in their entireties.

Such an indicator or indicators may function as a lane change assist (LCA) indicator or indicators and/or a blind spot indicator or indicators. Such blind spot indicators are typically activated when an object is detected (via a side object or blind spot detection system or the like such as described in U.S. Pat. Nos. 7,038,577; 6,882,287; 6,198, 409; 5,929,786; 5,786,772 and/or 7,720,580, and/or International Publication No. WO 2007/005942, which are hereby incorporated herein by reference in their entireties) at the side and/or rear of the vehicle (at the blind spot) and when the turn signal is also activated, so as to provide an alert to the driver of the host vehicle that there is an object or vehicle in the lane next to the host vehicle at a time when the driver of the host vehicle intends to move over into the adjacent lane. Optionally, and alternately, the indicator or indicators may function as a lane change assist indicator or indicators, where the host vehicle may be detected to be moving into an adjacent lane without the turn signal being activated, and an object or vehicle may be detected at the adjacent lane, whereby the LCA indicator or indicators may be activated to provide an alert to the driver of the lane change to assist the driver in avoiding unintentional lane changes and/or lane changes when a vehicle or object is detected in the adjacent lane.

The blind spot indicators thus may be operable to provide an indication to the driver of the host vehicle that an object or other vehicle has been detected in the lane or area adjacent to the side of the host vehicle. The blind spot indicator may be operable in association with a blind spot detection system, which may include an imaging sensor or sensors, or an ultrasonic sensor or sensors, or a sonar sensor or sensors or the like. For example, the blind spot detection system may utilize aspects of the blind spot detection and/or imaging systems described in U.S. Pat. Nos. 7,038,577; 6,882,287; 6,198,409; 5,929,786; 5,786,772; 7,881,496 and/or 7,720,580, and/or of the reverse or backup aid systems, such as the rearwardly directed vehicle vision systems described in U.S. Pat. Nos. 5,550,677; 5,760,962; 5,670, 935; 6,201,642; 6,396,397; 6,498,620; 6,717,610 6,757,109 and/or 7,005,974, and/or of the automatic headlamp controls described in U.S. Pat. Nos. 5,796,094; 5,715,093 and/or 7,526,103, and/or of the rain sensors described in U.S. Pat. Nos. 6,250,148 and 6,341,523, and/or of other imaging systems, such as the types described in U.S. Pat. Nos. 6,353,392 and 6,313,454, which may utilize various imaging sensors or imaging array sensors or cameras or the like, such as a CMOS imaging array sensor, a CCD sensor or other sensors or the like, such as the types disclosed in commonly assigned, U.S. Pat. Nos. 5,550,677; 5,760,962; 6,097,023 and/or 5,796,094, and/or PCT Application No. PCT/ US2003/036177 filed Nov. 14, 2003, published Jun. 3, 2004 as PCT Publication No. WO 2004/047421, with all of the above referenced U.S. patents, patent applications and provisional applications and PCT applications being commonly assigned and being hereby incorporated herein by reference in their entireties.

The reflective element of the rearview mirror assembly of vehicles may include an auxiliary wide angle or spotter mirror portion, such as the types described in U.S. Pat. Nos. 7,255,451; 7,195,381; 6,717,712; 7,126,456; 6,315,419; 7,097,312; 6,522,451; 6,315,419; 5,080,492; 5,050,977 and/ or 5,033,835, which are hereby incorporated herein by reference in their entireties, and optionally may have an integrally formed auxiliary mirror reflector, such as the types described in U.S. Pat. Nos. 8,736,940; 8,021,005; 7,934, 844; 7,887,204; 7,824,045 and 7,748,856, which are hereby incorporated herein by reference in their entireties. The auxiliary wide angle optic may be integrally formed such as by physically removing, such as by grinding or ablation or the like, a portion of the second surface of the front substrate so as to create or establish a physical dish-shaped generally convex-shaped depression or recess or crater at the second surface of the front substrate, and coating the formed depression or recess with a reflector coating or element or the like, such as described in U.S. Pat. No. 8,021,005, incorporated above. The mirror reflective element includes a demarcating layer or band or element that is disposed or established around the perimeter of the reflective element and around the perimeter of the spotter mirror so as to demarcate the spotter mirror from the main reflector portion to enhance the viewability and discernibility of the spotter mirror to the driver of the vehicle, such as by utilizing aspects of the hiding layers described in U.S. Pat. No. 8,736,940, which is hereby incorporated herein by reference in its entirety. The demarcating layer or contrasting coating or layer or material may comprise any suitable material, and may provide a different color or reflectivity or may comprise a dark or opaque color to demarcate the spotter mirror and enhance discernibility of the spotter mirror from the main mirror, which may comprise a flat mirror, a convex mirror or a free form mirror (such as utilizing aspects of the mirrors described in U.S. patent application Ser. No. 13/942,751, filed Jul. 16, 2013, now U.S. Pat. No. 8,917,437, which is hereby incorporated herein by reference in its entirety).

The mirror assembly may comprise any suitable construction, such as, for example, a mirror assembly with the reflective element being nested in the mirror casing and with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/ or 8,529,108, or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Des. Pat. Nos. D633,423; D633,019; D638,761 and/or D647,017, and/or International Publication Nos. WO 2010/124064, WO 2011/044312, WO 2012/051500, WO 2013/071070 and/or WO 2013/126719, which are hereby incorporated herein by reference in their entireties (and with electrochromic and prismatic mirrors of such construction are commercially available from the assignee of this application under the trade name INFINITY™ mirror).

Optionally, aspects of the mirror assemblies described above may be suitable for use in an interior rearview mirror assembly. Optionally, an interior rearview mirror assembly of the present invention may include a user input or button that is at or aligned with or at least partially protruding through a hole in the glass substrate or substrates of the mirror reflective element. For example, and with reference to FIGS. 37-41, an interior rearview mirror assembly 410 for a vehicle includes a casing 412 and a reflective element 414 positioned at a front portion of the casing 412, and the mirror assembly is configured to be adjustably mounted to an interior portion of a vehicle (such as to an interior or in-cabin surface of a vehicle windshield or a headliner of a vehicle or the like) via a mounting structure or mounting configuration or assembly 416. In the illustrated embodiment, a user input or button 418 is established at a hole or aperture 414*a* through the reflective element 414. The user input 418 is disposed at or connected with circuitry 420 of a circuit element 422 within the mirror assembly (FIG. 27), and may be associated with one or more illumination sources or light emitting diodes (LEDs) 424 or the like.

Typically, a user input for an interior rearview mirror assembly is located at the bezel of the mirror assembly, either at the front face of the mirror assembly or protruding from the lower surface of the mirror casing or housing. It is also known to provide capacitive switches behind the glass reflective element to limit or preclude the need for a bezel in cases where a mirror has a forward facing switch or input. The present invention provides a tactile button or switch element that protrudes through a hole in the glass mirror reflective element. Similar to capacitive switches, no bezel is needed to house the user input.

Figure 32:
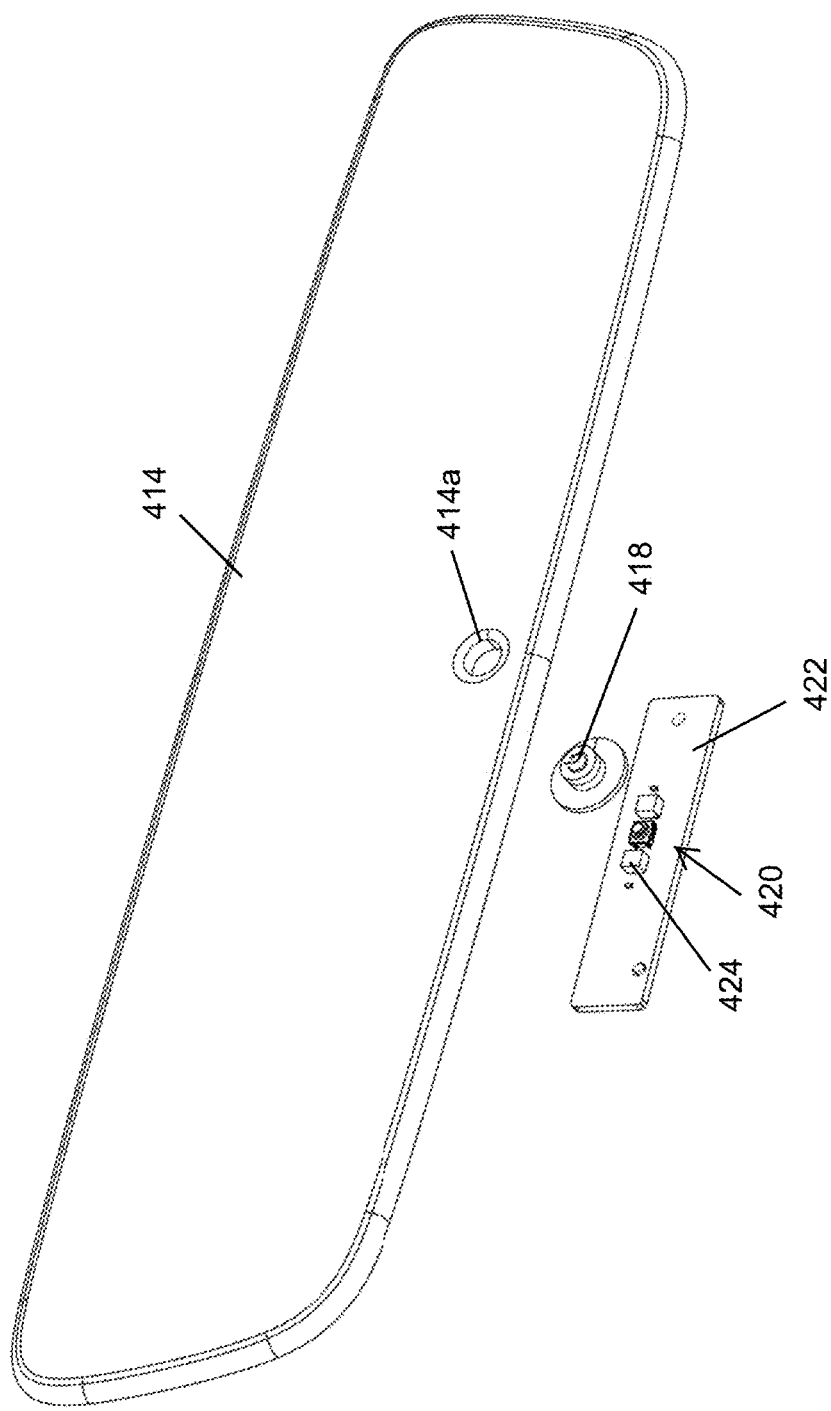
FIG. 32 is an exploded perspective view of the reflective element of FIG. 31.
Figure 33:
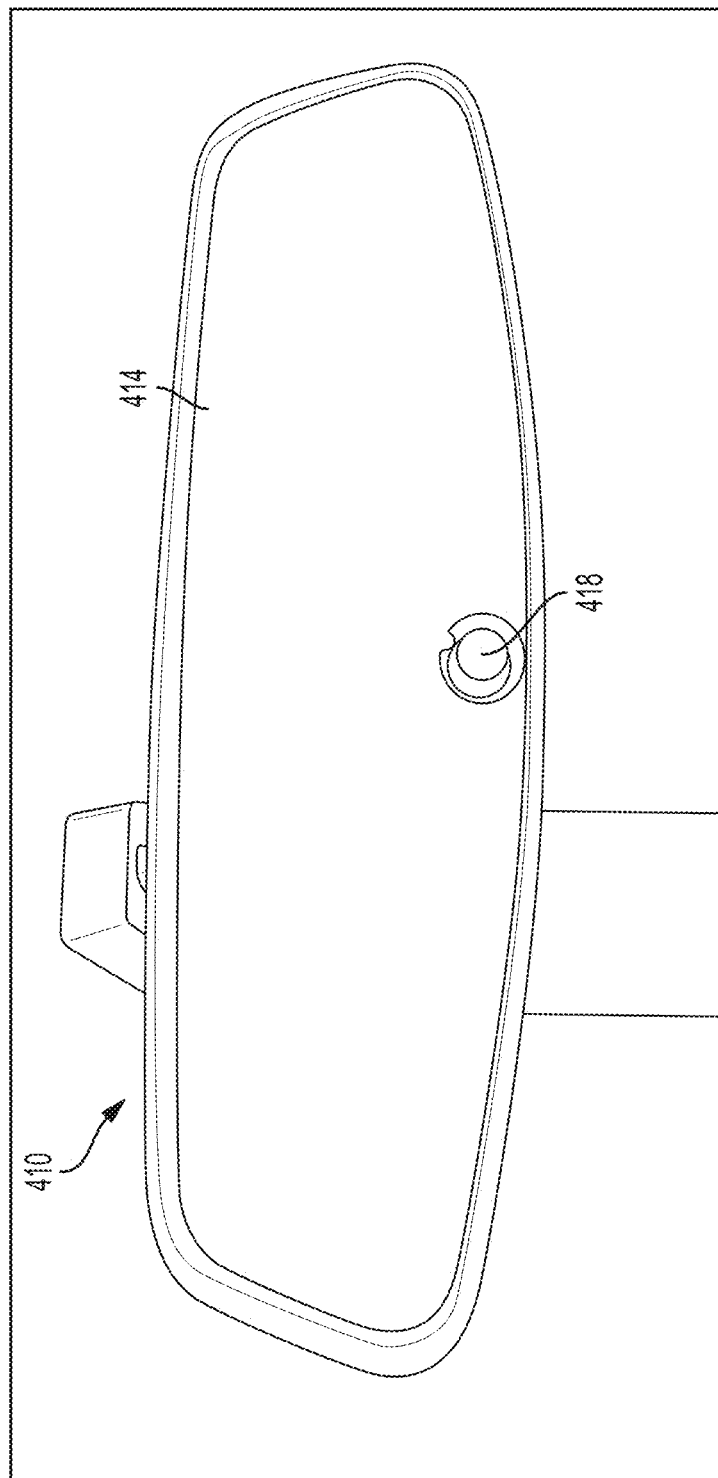
FIG. 33 is another perspective view of the reflective element of FIG. 31.
Figure 34:
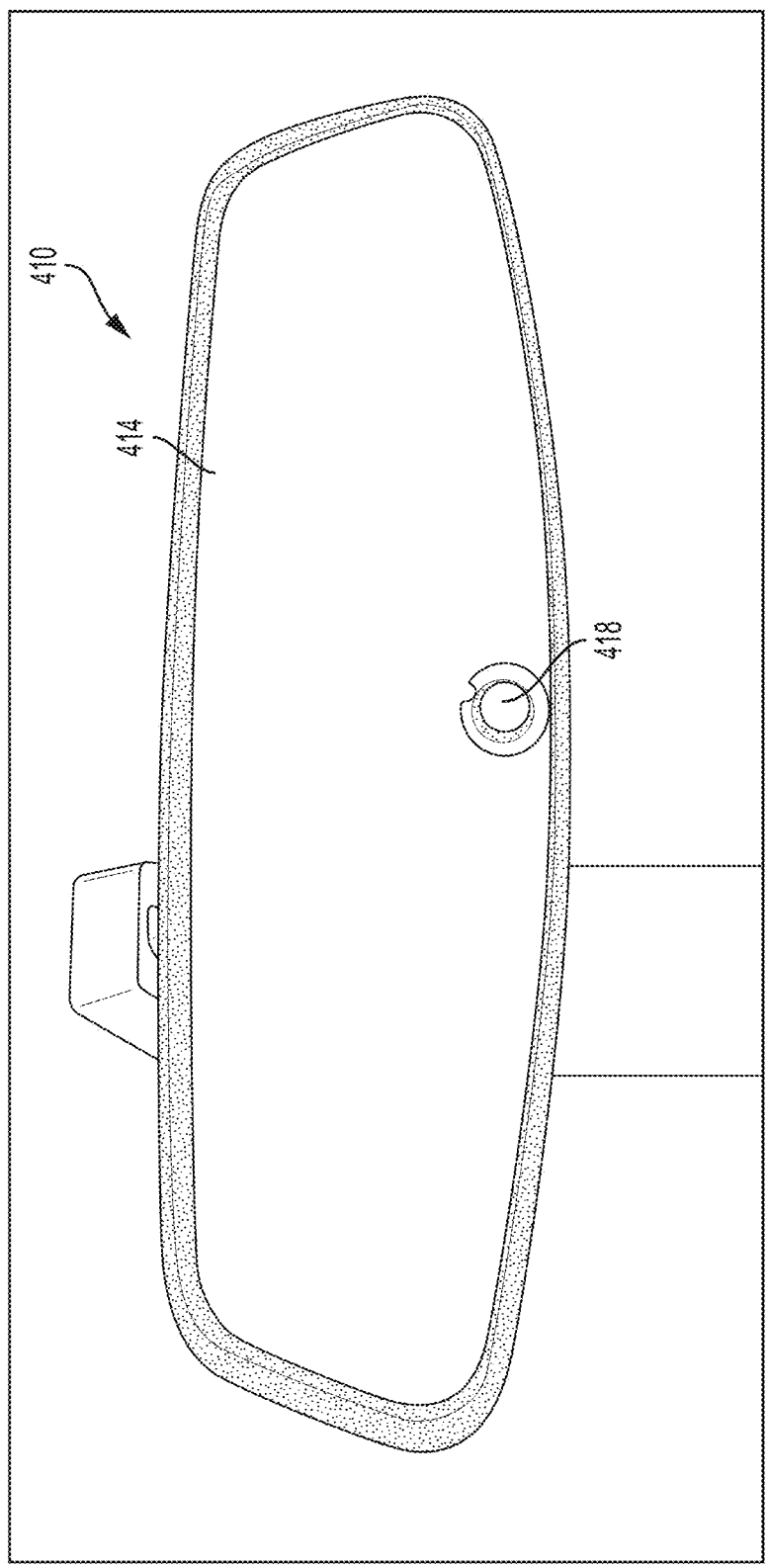
FIG. 34 is another perspective view of the mirror assembly of FIG. 33, shown with an illumination source at the user input actuated to illuminate the user input and a perimeter region of the reflective element.
Figure 35:
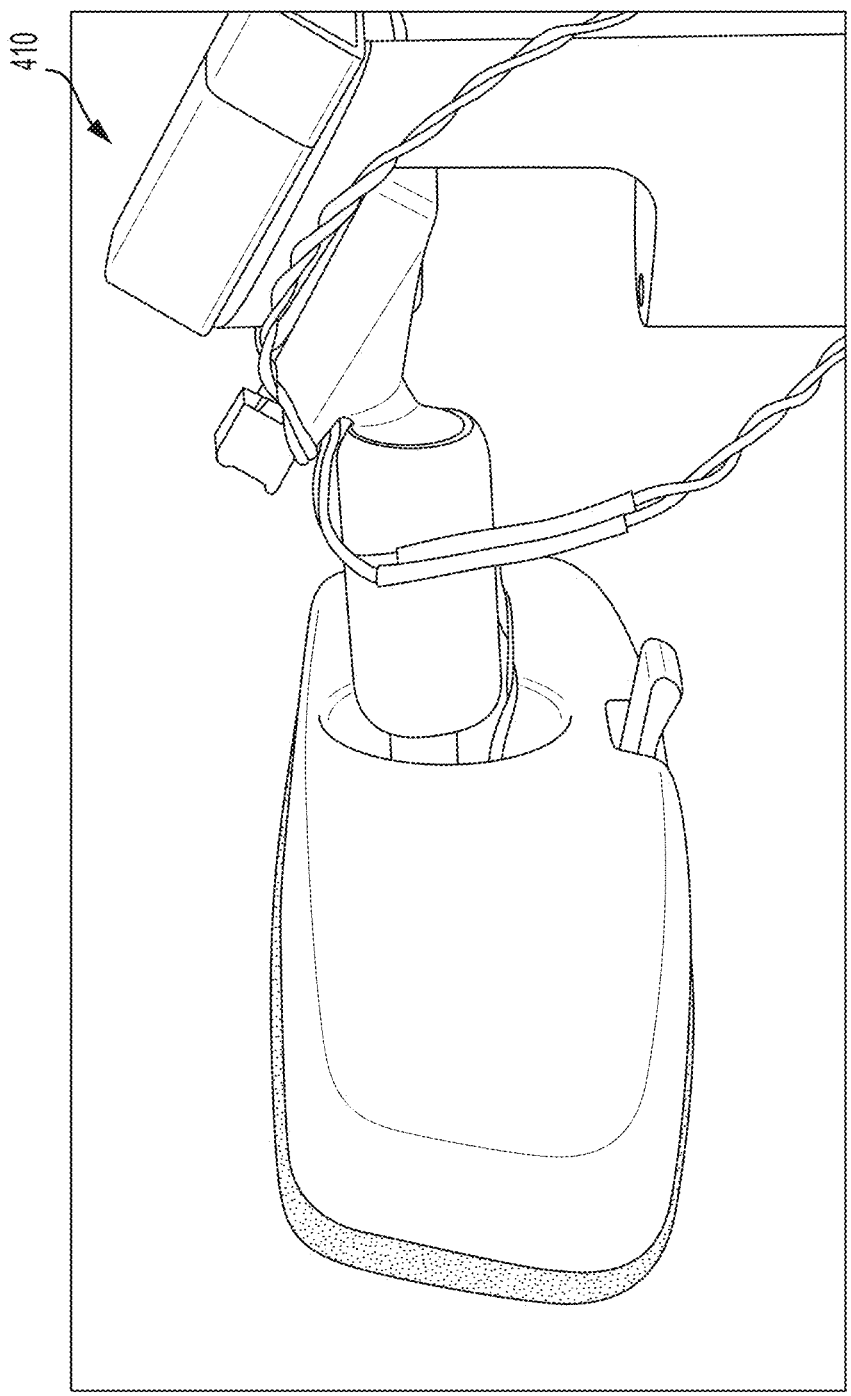
FIG. 35 is a rear perspective view of the mirror assembly of FIG. 34.

Optionally, and desirably, the user input system of the present invention includes an illumination source that, when activated, may backlight an icon at the surface of the button. The light source, when activated, may produce a soft glow around the perimeter of the button that is visible in the glass surrounding the button and hole. Optionally, and as can be seen in FIGS. 32-34, the outer or front glass surface of the glass substrate of the reflective element 414 may be chamfered or tapered at and around the hole 414a to further enhance the glow effect at and around the user input or button. For applications of the user input on frameless mirror elements (with the perimeter edge being rounded or curved and exposed), the light source has the added benefit of piping through the glass element (either a prismatic glass element or a front glass substrate of an electrochromic reflective element) and expanding outwards to the exposed perimeter edge of the glass substrate. When the perimeter edge is polished as in the INFINITY™ mirror designs, the perimeter edge will glow when the light is activated, thereby creating a theater effect.

Optionally, a mirror assembly of the present invention, such as an interior or exterior rearview mirror assembly, may include one or more electrically powered accessories or elements or devices. For example, a passenger vehicle exterior rearview mirror may have many electrical features such as motorized mirror adjustment actuators with position sensors, heaters, motorized retract feature, self-darkening glass, turn indicators, blind zone alert indicators, ground illuminators and/or the like. Each of these accessories or devices has wires connected to it that are routed from the rear-view mirror assembly into the door or body of the vehicle.

Figure 36:
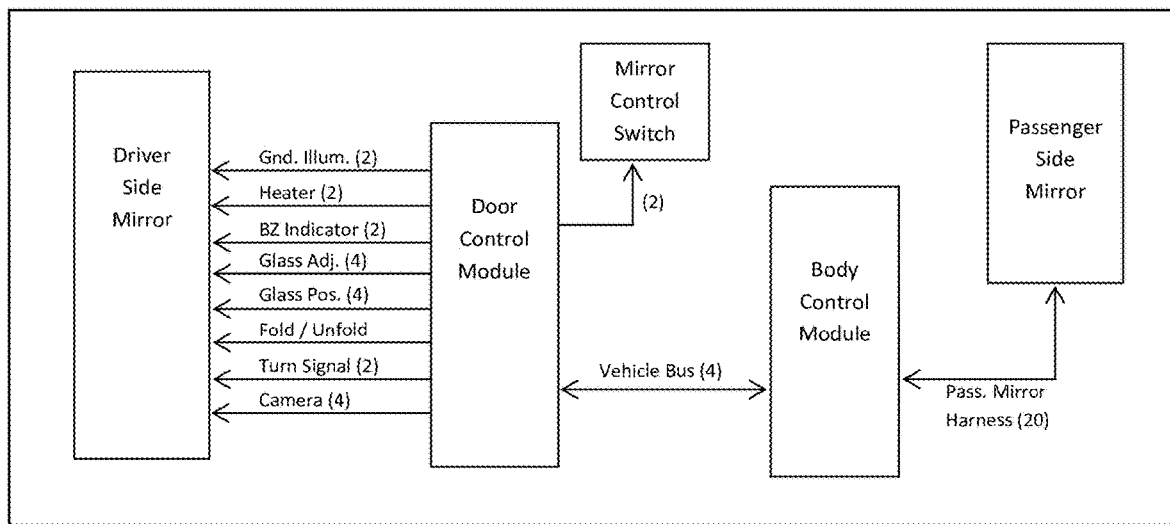
FIG. 36 is a schematic of an exterior rearview mirror assembly and wiring system for an exterior rearview mirror assembly.

In such a full-featured exterior rearview mirror, and such as can be seen with reference to FIG. 36, the wire harness may have up to about twenty wires or more leading from the mirror assembly into the vehicle. This causes difficulty with harness routing and connection reliability, and adds a significant amount of cost and weight to the vehicle.

As shown in FIG. 36, various wired connections may be made within a vehicle to control the mirror functions. Wiring for individual functions are shown in FIG. 36 at the driver side mirror, while all functions are shown grouped together on the passenger side mirror for simplicity. Some vehicles may also incorporate a door control module in the passenger door which has been omitted for simplicity.

Optionally, in order to reduce the number of wires at the mirror assembly, the mirror assembly may use wireless communication technology. As wireless technology becomes more common in the marketplace, wireless hardware costs are decreasing to the point where wireless technology will eventually become a viable alternative to wires for many functions in a vehicle.

Figure 37:
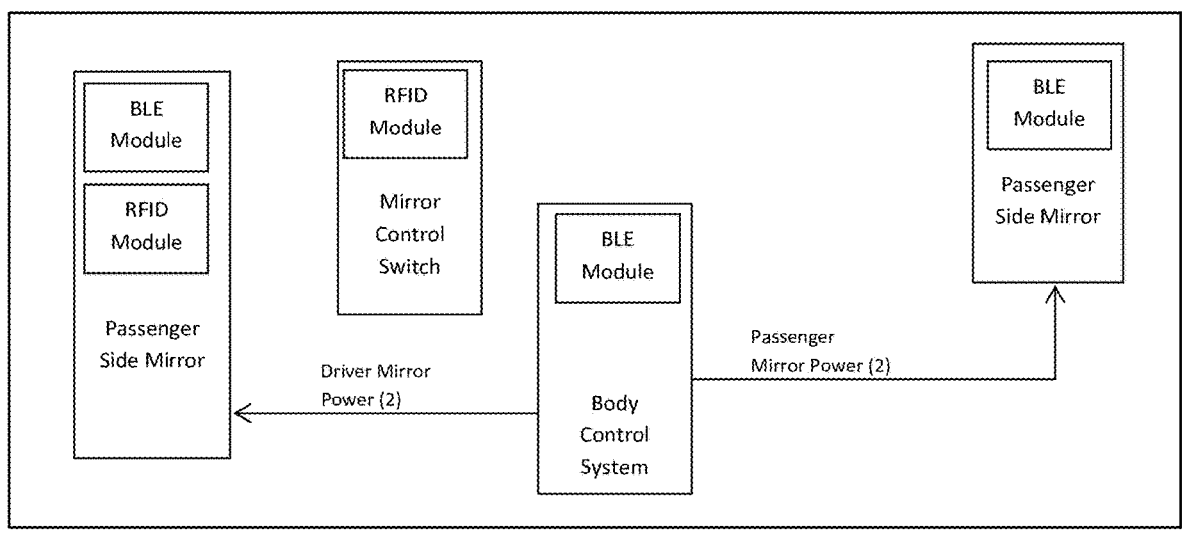
FIG. 37 is a schematic of an exterior rearview mirror assembly and wireless control system for an exterior rearview mirror assembly in accordance with the present invention.

If power from the vehicle bus is supplied to the mirrors, all other function control can be accomplished using wireless technology, such as Bluetooth 4.0 (BLE) or Zigbee or the like. RFID technology can additionally be used in the case of switches, which could further eliminate the need to route power wires to the switch module. For example, and as shown in FIG. 37, the mirror may use wireless technology to provide control of the various accessories or electrical content and/or features, such as sensors and actuators of the types described above and/or such as other accessories, including illumination sources or modules (such as for ground illumination, blind zone indication, turn signal indication and/or the like), heating elements, cameras and/or the like.

The reflective elements of the mirror assemblies described above may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, and/or International Publication No. WO 2010/114825, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein in their entireties, and/or as described in U.S. Pat. No. 7,195,381, which is hereby incorporated herein by reference in its entirety.

Optionally, it is envisioned that aspects of the mirror assemblies of the present invention may be suitable for a rearview mirror assembly that comprises a non-electro-optic mirror assembly (such as a generally planar or optionally slightly curved mirror substrate) or an electro-optic or electrochromic mirror assembly. Optionally, the rearview mirror assembly may comprise a mirror assembly of the types described in U.S. Pat. Nos. 7,420,756; 7,289,037; 7,274,501; 7,338,177; 7,255,451; 7,249,860; 6,318,870; 6,598,980; 5,327,288; 4,948,242; 4,826,289; 4,436,371 and/or 4,435,042, which are hereby incorporated herein by reference in their entireties. A variety of mirror accessories and constructions are known in the art, such as those disclosed in U.S. Pat. Nos. 5,555,136; 5,582,383; 5,680,263; 5,984,482; 6,227,675; 6,229,319 and/or 6,315,421 (which are hereby incorporated herein by reference in their entireties), that can benefit from the present invention.

Optionally, the reflective element of the mirror assemblies described herein may include an opaque or substantially opaque or hiding perimeter layer or coating or band disposed around a perimeter edge region of the front substrate (such as at a perimeter region of the rear or second surface of the front substrate) to conceal or hide or the perimeter seal from viewing by the driver of the vehicle when the mirror assembly is normally mounted in the vehicle. Such a hiding layer or perimeter band may be reflective or not reflective and may utilize aspects of the perimeter bands and mirror assemblies described in U.S. Pat. Nos. 5,066,112; 7,626, 749; 7,274,501; 7,184,190 and/or 7,255,451, and/or International Publication Nos. WO 2010/124064 and/or WO 2011/044312, and/or U.S. Pat. Pub. No. US-2006-0061008, which are all hereby incorporated herein by reference in their entireties. Optionally, the perimeter band may comprise a chrome/chromium coating or metallic coating and/or may comprise a chrome/chromium or metallic coating that has a reduced reflectance, such as by using an oxidized chrome coating or chromium oxide coating or "black chrome" coating or the like (such as by utilizing aspects of the mirror assemblies described in U.S. Pat. Nos. 7,184,190 and/or 7,255,451, which are hereby incorporated herein by reference in their entireties). Optionally, other opaque or substantially opaque coatings or bands may be implemented while remaining within the spirit and scope of the present invention.

The mirror assembly may comprise or utilize aspects of other types of casings or the like, such as described in U.S. Pat. Nos. 7,338,177; 7,289,037; 7,249,860; 6,439,755; 4,826,289 and 6,501,387, which are all hereby incorporated herein by reference in their entireties, without affecting the scope of the present invention. For example, the mirror assembly may utilize aspects of the flush or frameless or bezelless reflective elements described in U.S. Pat. Nos. 7,626,749; 7,360,932; 7,289,037; 7,255,451; 7,274,501 and/ or 7,184,190, and/or in U.S. Pat. Pub. Nos. US-2006-0061008 and/or US-2006-0050018, which are all hereby incorporated herein by reference in their entireties.

Optionally, the mirror assembly may comprise a modular mirror construction, and may include back housing portions or the like, such as cap portions of the types described in U.S. Pat. No. 7,289,037, which is hereby incorporated herein by reference in its entirety. A display screen may be provided as a modular display screen and may be mountable or installable in the appropriate or suitable mirror casing to provide a modular mirror assembly and display screen. For example, a rear casing or cap portion may include the display screen module including the associated components, such as the rails and motor and the like for a video slideout module (such as by utilizing aspects of the video mirrors described in U.S. Pat. Nos. 7,370,983 and 6,690,268, and/or U.S. Pat. Pub. Nos. US-2006-0050018 and/or US-2009-0015736, which are hereby incorporated herein by reference in their entireties), and may be attachable to a reflective element and/or mirror casing to assemble the modular mirror assembly. The display screen module thus may be provided as an optional component or accessory for a vehicle, and may be readily assembled to a common reflective element and/or mirror casing of the mirror assembly.

Optionally, the mirror casing and/or reflective element may include customized or personalized viewable characteristics, such as color or symbols or indicia selected by the vehicle manufacturer or owner of the vehicle, such as the customization characteristics described in U.S. Pat. Nos. 7,626,749; 7,255,451; 7,289,037, which are hereby incorporated herein by reference in their entireties.

Optionally, the mirror assembly may include an imaging sensor (such as a sideward and/or rearward facing imaging sensor or camera that has a sideward/rearward field of view at the side of the vehicle at which the exterior mirror assembly is mounted) that may be part of or may provide an image output for a vehicle vision system, such as a lane departure warning system or object detection system or blind zone alert system or surround view vision system other vehicle vision system or the like, and may utilize aspects of various imaging sensors or imaging array sensors or cameras or the like, such as a CMOS imaging array sensor, a CCD sensor or other sensors or the like, such as the types described in U.S. Pat. Nos. U.S. Pat. Nos. 5,550,677; 5,670,935; 5,760,962; 6,498,620; 6,396,397; 6,222,447; 6,201,642; 6,097,023; 5,877,897; 5,796,094; 5,715,093; 6,922,292; 6,757,109; 6,717,610; 6,590,719; 6,320,176; 6,559,435; 6,831,261; 6,806,452; 6,822,563; 6,946,978; 7,038,577; 7,004,606 and/or 7,720,580, and/or U.S. patent application Ser. No. 12/187,725, filed Aug. 7, 2008, which are all hereby incorporated herein by reference in their entireties. Optionally, for example, the vehicle vision system (utilizing a forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described International Publication Nos. WO 2010/099416; WO 2011/028686; WO 2012/ 075250; WO 2013/019795; WO 2012-075250; WO 2012/ 154919; WO 2012/0116043; WO 2012/0145501; WO 2012/ 0145313; WO 2012/145822; WO 2013/081985; WO 2013/ 086249 and/or WO 2013/109869, and/or U.S. patent application Ser. No. 13/333,337, filed Dec. 21, 2011, now U.S. Pat. No. 9,264,672, which are hereby incorporated herein by reference in their entireties.

Optionally, the mirror assembly or the vehicle may include one or more displays, such as the types disclosed in U.S. Pat. Nos. 5,530,240 and/or 6,329,925, which are hereby incorporated herein by reference in their entireties, and/or display-on-demand transflective type displays, and/or video displays or display screens, such as the types disclosed in U.S. Pat. Nos. 7,855,755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. patent application Ser. No. 13/023,750, filed Feb. 9, 2011, now U.S. Pat. No. 8,890,955; Ser. No. 09/585,379, filed Jun. 1, 2000, now abandoned, and/or Ser. No. 10/207,291, filed Jul. 29, 2002, now abandoned, and/or in U.S. Pat. Pub. Nos. US-2006-0061008; US-2006-0050018; US-2009-0015736; US-2009-0015736 and/or US-2010-0097469, and/or in International Publication No. WO 2011/028686, which are all hereby incorporated herein by reference in their entireties.

The video display screen may be controlled or operable in response to an input or signal, such as a signal received from one or more cameras or image sensors of the vehicle, such as a video camera or sensor, such as a CMOS imaging array sensor, a CCD sensor or the like, and image processors or image processing techniques, such as utilizing aspects of the cameras and image processors described U.S. Pat. Nos. 5,550,677; 5,670,935; 5,760,962; 6,498,620; 6,396,397; 6,222,447; 6,201,642; 6,097,023; 5,877,897; 5,796,094; 5,715,093; 6,922,292; 6,757,109; 6,717,610; 6,590,719; 6,320,176; 6,559,435; 6,831,261; 6,806,452; 6,822,563; 6,946,978; 7,038,577; 7,004,606 and/or 7,720,580, and/or U.S. Pat. Pub. Nos. US-2006-0171704; US-2009-0244361 and/or US-2010-0214791, and/or International Publication Nos. WO 2009/046268 and/or WO 2009/036176, which are hereby incorporated herein by reference in their entireties, or from one or more imaging systems of the vehicle, such as a reverse or backup aid system, such as a rearwardly directed vehicle vision system utilizing principles disclosed in U.S. Pat. Nos. 5,550,677; 5,760,962; 5,670,935; 6,201,642; 6,396,397; 6,498,620; 6,717,610 and/or 6,757,109, which are hereby incorporated herein by reference in their entireties, a trailer hitching aid or tow check system, such as the type disclosed in U.S. Pat. No. 7,005,974, which is hereby incorporated herein by reference in its entirety, a cabin viewing or monitoring device or system, such as a baby viewing or rear seat viewing camera or device or system or the like, such as disclosed in U.S. Pat. Nos. 5,877,897 and/or 6,690,268, which are hereby incorporated herein by reference in their entireties, a video communication device or system, such as disclosed in U.S. Pat. No. 6,690,268, which is hereby incorporated herein by reference in its entirety, and/or the like. The imaging sensor or camera may be activated and the display screen may be activated in response to the vehicle shifting into reverse, such that the display screen is viewable by the driver and is displaying an image of the rearward scene while the driver is reversing the vehicle. It is envisioned that an image processor or controller (such as an EYEQ™ image processing chip available from Mobileye Vision Technologies Ltd. of Jerusalem, Israel, and such as an image processor of the types described in International Pub. No. WO/2010/099416, which is hereby incorporated herein by reference in its entirety) may process image data captured by the camera or cameras, such as for object detection or assessment of lighting conditions and/or the like.

Optionally, the mirror assembly may include other electrically operated or powered accessories, such as a compass sensor and compass display. Such a compass sensor and circuitry for the compass system that detects and displays the vehicle directional heading to a driver of the vehicle may comprise any suitable compass sensor and/or circuitry, such as a compass system and compass circuitry that utilizes aspects of the compass systems described in U.S. Pat. Nos. 7,370,983; 7,329,013; 7,289,037; 7,249,860; 7,004,593; 6,928,366; 6,642,851; 6,140,933; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460 and/or 6,513,252, and/or European patent application, published Oct. 11, 2000 under Publication No. EP 0 1043566, and/or U.S. Pat. Pub. No. US-2006-0061008, which are all hereby incorporated herein by reference in their entireties. The compass circuitry may include compass sensors, such as a magneto-responsive sensor, such as a magneto-resistive sensor, a magneto-capacitive sensor, a Hall sensor, a magneto-inductive sensor, a flux-gate sensor or the like. The compass sensor may be incorporated in or associated with a compass system and/or display system for displaying a directional heading of the vehicle to the driver, such as a compass system of the types described in U.S. Pat. Nos. 7,289,037; 5,924,212; 4,862,594; 4,937,945; 5,131,154; 5,255,442; 5,632,092 and/or 7,004,593, which are all hereby incorporated herein by reference in their entireties. Optionally, an integrated automotive "compass-on-a-chip" may be disposed in a cavity of the mounting base of the mirror (or within the mirror housing or in an attachment to the mirror mount or elsewhere within the mirror assembly such as to the rear of the video screen or to the rear of the mirror reflective element) and may comprise at least two sensor elements (such as magneto-responsive sensor elements, or a Hall effect sensor or multiple Hall effect sensors), associated A/D and D/A converters, associated microprocessor(s) and memory, associated signal processing and filtering, associated display driver and associated LIN/CAN BUS interface and the like, all (or a sub-set thereof) created or disposed or commonly established onto a semiconductor chip surface/substrate or silicon substrate, such as utilizing CMOS technology and/or fabrication techniques as known in the semiconductor manufacturing arts, and constituting an application specific integrated chip ("ASIC"), such as utilizing principles described in U.S. Pat. Nos. 7,815,326; 7,004,593; 7,329,013 and/or 7,370,983, and/or U.S. Pat. Pub. No. US-2006-0061008, which are hereby incorporated herein by reference in their entireties, and/or such as by utilizing aspects of an EC driver-on-a-chip such as described in U.S. Pat. No. 7,480,149, which is hereby incorporated herein by reference in its entirety.

Optionally, the mirror assembly and/or any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Pat. Pub. No. US-2006-0050018, which are hereby incorporated herein by reference in their entireties.

Optionally, the mirror assembly may include one or more other accessories at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775 and/or 7,249,860, microphones, such as disclosed in U.S. Pat. Nos. 7,657,052; 6,243,003; 6,278,377 and/or 6,420,975, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 7,720,580; 7,038,577; 6,882,287; 5,929,786 and/or 5,786,772, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 7,400,435; 7,526,103; 6,690,268 and/or 6,847,487, and/or U.S. Pat. Pub. No. US-2006-0125919, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205 and/or 7,423,522, and/or an ONSTAR® system, a compass, such as disclosed in U.S. Pat. Nos. 5,924,212; 4,862,594; 4,937,945; 5,131,154; 5,255,442 and/or 5,632,092, and/or any other accessory or circuitry or the like (with all of the above-referenced patents and PCT and U.S. patent applications being commonly assigned and being hereby incorporated herein by reference in their entireties).

Optionally, the accessory or accessories, such as those described above and/or below, may be positioned at or within the mirror casing and/or mirror cap portion or the like, and may be included on or integrated in a printed circuit board positioned within the mirror casing and/or cap portion, such as along a rear surface of the reflective element or elsewhere within a cavity defined by the casing, without affecting the scope of the present invention. The connection or link between the controls and the display screen device and/or the navigation system and/or other systems and accessories of the mirror system may be provided via vehicle electronic or communication systems and the like, and may be connected via various protocols or nodes, such as BLUETOOTH®, SCP, UBP, J1850, CAN J2284, Fire Wire 1394, MOST, LIN, FLEXRAY™, Byte Flight and/or the like, or other vehicle-based or in-vehicle communication links or systems (such as WIFI and/or IRDA) and/or the like, or via VHF or UHF or other wireless transmission formats, depending on the particular application of the mirror/accessory system and the vehicle. Optionally, the connections or links may be provided via various wireless connectivity or links, without affecting the scope of the present invention.

Changes and modifications in the specifically described embodiments may be carried out without departing from the principles of the present invention, which is intended to be limited only by the scope of the appended claims as interpreted according to the principles of patent law.

The invention claimed is:

1. A vehicular exterior rearview mirror assembly, the vehicular exterior rearview mirror assembly comprising:
a mirror head accommodating a mirror reflective element;
a mounting base configured to mount the vehicular exterior rearview mirror assembly at a side of a vehicle equipped with the vehicular exterior rearview mirror assembly;
an indicator module accommodated by the mirror head;
wherein the indicator module is operable to project a respective icon responsive to a respective input of a plurality of inputs;
wherein, with the vehicular exterior rearview mirror assembly mounted at the side of the equipped vehicle, and responsive to actuation by a driver of the equipped vehicle of a turn signal input of the plurality of inputs, the indicator module projects a turn signal icon onto the ground proximate the side of the equipped vehicle;
wherein, with the vehicular exterior rearview mirror assembly mounted at the side of the equipped vehicle, and responsive to another input of the plurality of inputs, the indicator module projects another icon onto the ground proximate the side of the equipped vehicle; and
wherein the other icon projected onto the ground is a different color than the turn signal icon projected onto the ground.

2. The vehicular exterior rearview mirror assembly of claim 1, wherein, with the vehicular exterior rearview mirror assembly mounted at the side of the equipped vehicle, the indicator module is disposed at a lower region of the mirror head.

3. The vehicular exterior rearview mirror assembly of claim 1, wherein the indicator module projects the turn signal icon via actuation of at least one light emitting diode of the indicator module.

4. The vehicular exterior rearview mirror assembly of claim 1, wherein the indicator module projects an amber-colored turn signal icon onto the ground.

5. The vehicular exterior rearview mirror assembly of claim 1, wherein the other icon projected onto the ground by the indicator module is a red-colored icon.

6. The vehicular exterior rearview mirror assembly of claim 1, wherein, with the vehicular exterior rearview mirror assembly mounted at the side of the equipped vehicle, the projected turn signal icon comprises a direction-indicating shape projected onto the ground proximate the side of the equipped vehicle with the projected direction-indicating shape indicating a direction away from the side of the equipped vehicle.

7. The vehicular exterior rearview mirror assembly of claim 1, wherein, with the vehicular exterior rearview mirror assembly mounted at the side of the equipped vehicle, the projected turn signal icon comprises an arrow projected onto the ground proximate the side of the equipped vehicle with the projected arrow pointing away from the side of the equipped vehicle.

8. The vehicular exterior rearview mirror assembly of claim 1, wherein, with the vehicular exterior rearview mirror assembly mounted at the side of the equipped vehicle, and responsive to actuation by the driver of the equipped vehicle of the turn signal input of the equipped vehicle, the indicator module intermittently projects the turn signal icon onto the ground proximate the side of the equipped vehicle.

9. The vehicular exterior rearview mirror assembly of claim 1, wherein, with the vehicular exterior rearview mirror assembly mounted at the side of the equipped vehicle, and responsive to actuation of a hazard light input of the equipped vehicle, the indicator module projects the other icon onto the ground proximate the side of the equipped vehicle.

10. The vehicular exterior rearview mirror assembly of claim 1, wherein, with the vehicular exterior rearview mirror assembly mounted at the side of the equipped vehicle, and responsive to actuation by the driver of the equipped vehicle of the turn signal input of the equipped vehicle, the indicator module provides a turn signal indication viewable along a forward and sideward portion of the mirror head.

11. The vehicular exterior rearview mirror assembly of claim 1, comprising another indicator module disposed at the mirror head, wherein the other indicator module, with the mounting base of the vehicular exterior rearview mirror assembly attached at the side of the equipped vehicle, and responsive to actuation by the driver of the equipped vehicle of the turn signal input of the equipped vehicle, provides a turn signal indication viewable by drivers of other vehicles at a side lane adjacent the equipped vehicle.

12. The vehicular exterior rearview mirror assembly of claim 11, wherein the other indicator module is disposed at and along a forward and sideward portion of the mirror head.

13. The vehicular exterior rearview mirror assembly of claim 1, comprising a camera module disposed at the mirror head, and wherein the camera module is adjustable to adjust a field of view of the camera module.

14. The vehicular exterior rearview mirror assembly of claim 1, comprising a wide angle spotter mirror disposed at an upper outboard corner of the mirror head, and wherein the wide angle spotter mirror is integrally formed with an upper portion of a mirror casing of the mirror head.

15. The vehicular exterior rearview mirror assembly of claim 1, comprising a powerfold actuator operable to pivot the mirror head relative to the mounting base between at least a park detent position, where the mirror head engages a park detent, and a drive detent position, where the mirror head engages a drive detent, and wherein, responsive to a user input, the powerfold actuator pivots the mirror head to the park detent position or the drive detent position, and wherein the mirror head engages one of the park detent and the drive detent to re-engage the detent before the mirror head moves relative to the mounting base.

16. A vehicular exterior rearview mirror assembly, the vehicular exterior rearview mirror assembly comprising:
a mirror head accommodating a mirror reflective element;
a mounting base configured to mount the vehicular exterior rearview mirror assembly at a side of a vehicle equipped with the vehicular exterior rearview mirror assembly;
an indicator module accommodated by the mirror head;
wherein, with the vehicular exterior rearview mirror assembly mounted at the side of the equipped vehicle, the indicator module is disposed at a lower region of the mirror head;
wherein the indicator module is operable to project a respective icon responsive to a respective input of a plurality of inputs;
wherein, with the vehicular exterior rearview mirror assembly mounted at the side of the equipped vehicle, and responsive to actuation by a driver of the equipped vehicle of a turn signal input of the plurality of inputs, the indicator module projects a turn signal icon onto the ground proximate the side of the equipped vehicle;
wherein, with the vehicular exterior rearview mirror assembly mounted at the side of the equipped vehicle, the projected turn signal icon comprises an arrow projected onto the ground proximate the side of the equipped vehicle with the projected arrow pointing away from the side of the equipped vehicle;
wherein, with the vehicular exterior rearview mirror assembly mounted at the side of the equipped vehicle, and responsive to another input of the plurality of inputs, the indicator module projects another icon onto the ground proximate the side of the equipped vehicle; and
wherein the other icon projected onto the ground is a different color than the turn signal icon projected onto the ground.

17. The vehicular exterior rearview mirror assembly of claim 16, wherein the indicator module projects the turn signal icon via actuation of at least one light emitting diode of the indicator module.

18. The vehicular exterior rearview mirror assembly of claim 16, wherein, with the vehicular exterior rearview mirror assembly mounted at the side of the equipped vehicle, and responsive to actuation by the driver of the equipped vehicle of the turn signal input of the equipped vehicle, the indicator module intermittently projects the turn signal icon onto the ground proximate the side of the equipped vehicle.

19. The vehicular exterior rearview mirror assembly of claim 16, wherein, with the vehicular exterior rearview mirror assembly mounted at the side of the equipped vehicle, and responsive to actuation of a hazard light input of the equipped vehicle, the indicator module projects the other icon onto the ground proximate the side of the equipped vehicle.

20. The vehicular exterior rearview mirror assembly of claim 16, wherein, with the vehicular exterior rearview mirror assembly mounted at the side of the equipped vehicle, and responsive to actuation by the driver of the equipped vehicle of the turn signal input of the equipped vehicle, the indicator module provides a turn signal indication viewable along a forward and sideward portion of the mirror head.

21. A vehicular exterior rearview mirror assembly, the vehicular exterior rearview mirror assembly comprising:
a mirror head accommodating a mirror reflective element;
a mounting base configured to mount the vehicular exterior rearview mirror assembly at a side of a vehicle equipped with the vehicular exterior rearview mirror assembly;
an indicator module accommodated by the mirror head;
wherein the indicator module is operable to project a respective icon responsive to a respective input of a plurality of inputs;
wherein, with the vehicular exterior rearview mirror assembly mounted at the side of the equipped vehicle, and responsive to actuation by a driver of the equipped vehicle of a turn signal input of the plurality of inputs, the indicator module intermittently projects a turn signal icon onto the ground proximate the side of the equipped vehicle;
wherein, with the vehicular exterior rearview mirror assembly mounted at the side of the equipped vehicle, the projected turn signal icon comprises a direction-indicating shape projected onto the ground proximate the side of the equipped vehicle with the projected direction-indicating shape indicating a direction away from the side of the equipped vehicle;
wherein the indicator module projects the turn signal icon via actuation of at least one light emitting diode of the indicator module;
wherein, with the vehicular exterior rearview mirror assembly mounted at the side of the equipped vehicle, and responsive to another input of the plurality of inputs, the indicator module projects another icon onto the ground proximate the side of the equipped vehicle; and
wherein the other icon projected onto the ground is a different color than the turn signal icon projected onto the ground.

22. The vehicular exterior rearview mirror assembly of claim 21, wherein, with the vehicular exterior rearview mirror assembly mounted at the side of the equipped vehicle, the indicator module is disposed at a lower region of the mirror head.

23. The vehicular exterior rearview mirror assembly of claim 21, wherein the indicator module projects an amber-colored turn signal icon onto the ground.

24. The vehicular exterior rearview mirror assembly of claim 21, wherein the other icon projected onto the ground by the indicator module is a red-colored icon.

25. The vehicular exterior rearview mirror assembly of claim 21, wherein, with the vehicular exterior rearview mirror assembly mounted at the side of the equipped vehicle, and responsive to actuation of a hazard light input of the equipped vehicle, the indicator module projects the other icon onto the ground proximate the side of the equipped vehicle.

26. The vehicular exterior rearview mirror assembly of claim 21, wherein, with the vehicular exterior rearview mirror assembly mounted at the side of the equipped vehicle, and responsive to actuation by the driver of the equipped vehicle of the turn signal input of the equipped vehicle, the indicator module provides a turn signal indication viewable along a forward and sideward portion of the mirror head.

\* \* \* \* \*